(12) United States Patent
Tsuchimoto et al.

(10) Patent No.: US 12,446,344 B2
(45) Date of Patent: Oct. 14, 2025

(54) SOLID-STATE IMAGE SENSOR

(71) Applicant: SONY SEMICONDUCTOR SOLUTIONS CORPORATION, Kanagawa (JP)

(72) Inventors: Koya Tsuchimoto, Nagasaki (JP); Shin Kitano, Kanagawa (JP); Yusuke Murakawa, Nagasaki (JP); Makoto Nakamura, Nagasaki (JP); Takuya Hanada, Nagasaki (JP); Yuki Noda, Nagasaki (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 609 days.

(21) Appl. No.: 17/794,865

(22) PCT Filed: Jan. 18, 2021

(86) PCT No.: PCT/JP2021/001408
§ 371 (c)(1),
(2) Date: Jul. 22, 2022

(87) PCT Pub. No.: WO2021/153295
PCT Pub. Date: Aug. 5, 2021

(65) Prior Publication Data
US 2023/0058009 A1    Feb. 23, 2023

(30) Foreign Application Priority Data
Jan. 31, 2020 (JP) .................. 2020-015827

(51) Int. Cl.
*H10F 39/00* (2025.01)
*H10F 39/18* (2025.01)

(52) U.S. Cl.
CPC ......... *H10F 39/8057* (2025.01); *H10F 39/18* (2025.01); *H10F 39/809* (2025.01); *H10F 39/811* (2025.01)

(58) Field of Classification Search
CPC .... H10F 39/8057; H10F 39/18; H10F 39/809; H10F 39/811; H10F 39/802; H10F 39/803; H10F 39/8063; H10F 39/807
See application file for complete search history.

(56) References Cited

U.S. PATENT DOCUMENTS

2006/0278896 A1* 12/2006 Inoue ................ H10F 39/8057
257/215
2009/0101914 A1* 4/2009 Hirotsu ................ H10F 39/813
257/E31.079
(Continued)

FOREIGN PATENT DOCUMENTS

CN    102082189 A    6/2011
CN    102404514 A    4/2012
(Continued)

OTHER PUBLICATIONS

International Search Report and Written Opinion prepared by the Japan Patent Office on Mar. 26, 2021, for International Application No. PCT/JP2021/001408, 2 pgs.

(Continued)

*Primary Examiner* — Yasser A Abdelaziz
(74) *Attorney, Agent, or Firm* — SHERIDAN ROSS P.C.

(57) ABSTRACT

A solid-state image sensor according to the present disclosure includes a photodiode, a conversion circuit (current-voltage conversion circuit), a luminance change detection circuit (comparator), and a light-shielding unit (light-shielding film). The photodiode photoelectrically converts incident light to generate a photocurrent. The conversion circuit (current-voltage conversion circuit) converts the photocurrent into a voltage signal. The luminance change detection (Continued)

circuit (comparator) detects a change in luminance of the incident light on the basis of the voltage signal. The light-shielding unit (light-shielding film) shields incidence of light on the impurity diffusion region included in a circuit that inputs the voltage signal to the luminance change detection circuit (comparator).

19 Claims, 21 Drawing Sheets

(56) References Cited

U.S. PATENT DOCUMENTS

| | | | |
|---|---|---|---|
| 2010/0214457 | A1 | 8/2010 | Sakai |
| 2018/0350854 | A1* | 12/2018 | Miura .................. H04N 25/70 |
| 2020/0351455 | A1* | 11/2020 | Niwa .................. H04N 25/53 |

FOREIGN PATENT DOCUMENTS

| | | | |
|---|---|---|---|
| CN | 102412254 | A | 11/2012 |
| CN | 105407302 | A | 3/2016 |
| CN | 109690779 | A | 4/2019 |
| EP | 3879571 | * | 9/2021 |
| JP | H01055859 | A | 2/1998 |
| JP | 2002057315 | A | 2/2002 |
| JP | 2003031782 | A | 1/2003 |
| JP | 2010283859 | A | 12/2010 |
| JP | 2011035154 | A | 2/2011 |
| JP | 2011215404 | A | 10/2011 |
| JP | 2011216970 | A | 10/2011 |
| JP | 2012129798 | A | 7/2012 |
| JP | 2015228510 | A | 12/2015 |
| JP | 2019-134271 | | 8/2019 |
| WO | WO-2013115075 | A1 | 8/2013 |
| WO | WO-2015198876 | A1 | 12/2015 |
| WO | WO 2019/087471 | | 5/2019 |
| WO | WO 2019/087472 | | 5/2019 |

OTHER PUBLICATIONS

Cai Huaiyu et al., "A system for examining the illumination uniformity of camera imaging planes", Optical Technique, vol. 26, No. 5, Sep. 20, 2000, full text.

* cited by examiner

SOLID-STATE IMAGE SENSOR

CROSS REFERENCE TO RELATED APPLICATIONS

This application is a national stage application under 35 U.S.C. 371 and claims the benefit of PCT Application No. PCT/JP2021/001408, having an international filing date of 18 Jan. 2021, which designated the United States, which PCT application claimed the benefit of Japanese Patent Application No. 2020-015827, filed 31 Jan. 2020, the entire disclosures of each of which are incorporated herein by reference.

TECHNICAL FIELD

The present disclosure relates to a solid-state image sensor.

BACKGROUND ART

A solid-state image sensor used in a dynamic vision system photoelectrically converts incident light into a voltage signal, and detects a luminance change in the incident light on the basis of the voltage signal (see, for example, Patent Document 1.).

CITATION LIST

Patent Document

Patent Document 1: International Publication No. 2019/087472

SUMMARY OF THE INVENTION

Problems to be Solved by the Invention

However, in the solid-state image sensor that detects the luminance change in the incident light, a voltage of the voltage signal varies, and detection accuracy of the luminance change may deteriorate in a case where the irradiation of stray light occurs inside.

Therefore, the present disclosure proposes a solid-state image sensor capable of suppressing a decrease in the detection accuracy of a luminance change.

Solutions to Problems

A solid-state image sensor according to the present disclosure includes a photodiode, a conversion circuit, a luminance change detection circuit, and a light-shielding unit. The photodiode photoelectrically converts incident light to generate a photocurrent. The conversion circuit converts the photocurrent into a voltage signal. The luminance change detection circuit detects a change in luminance of the incident light on the basis of the voltage signal. The light-shielding unit shields incidence of light to an impurity diffusion region included in a circuit that inputs the voltage signal to the luminance change detection circuit.

MODE FOR CARRYING OUT THE INVENTION

Figure 1:
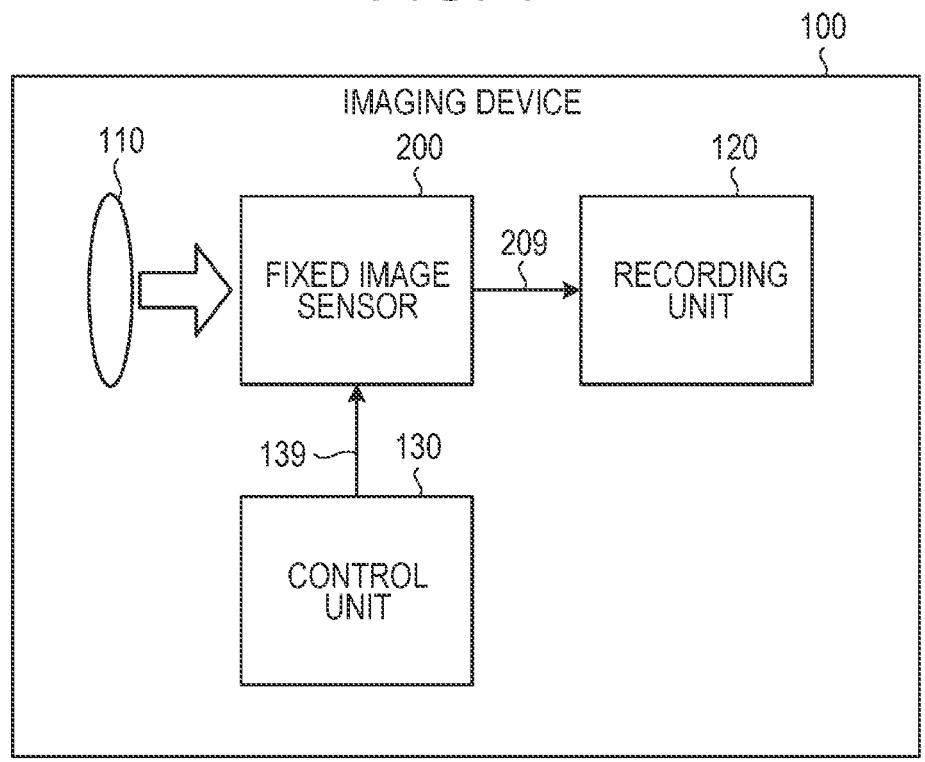
FIG. 1 is a block diagram illustrating a configuration example of an imaging device according to the present disclosure.

Hereinafter, embodiments of the present disclosure will be described in detail with reference to the drawings. Note that, in the following each embodiment, the same components or configuration elements having the same function are denoted by the same reference numerals, and redundant description will be omitted.

1. Configuration Example of Imaging Device

FIG. 1 is a block diagram illustrating a configuration example of an imaging device 100 according to the present disclosure. The imaging device 100 captures image data, and includes an imaging lens 110, a solid-state image sensor 200, a recording unit 120, and a control unit 130. As the imaging device 100, a camera mounted on an industrial robot, an in-vehicle camera, or the like is assumed.

The imaging lens 110 condenses incident light and guides the incident light to the solid-state image sensor 200. The solid-state image sensor 200 is also referred to as a dynamic vision sensor (DVS), and photoelectrically converts the incident light to capture image data. The solid-state image sensor 200 executes predetermined signal processing such as image recognition processing for the captured image data, and outputs processed data to the recording unit 120 via a signal line 209.

The recording unit 120 records the data from the solid-state image sensor 200. The control unit 130 controls the solid-state image sensor 200 to capture the image data.

2. Configuration Example of Solid-State Image Sensor

Figure 2:
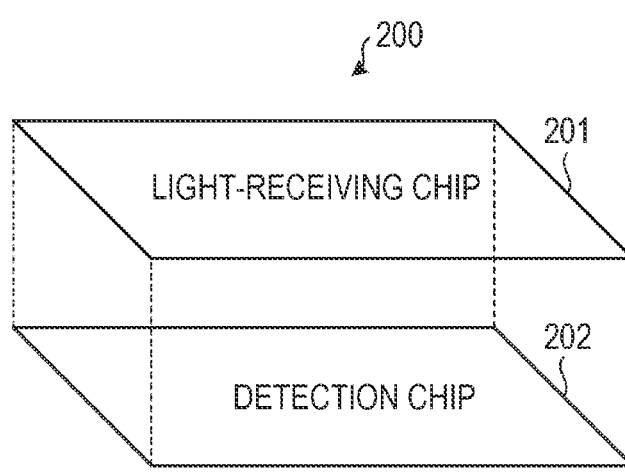
FIG. 2 is a diagram illustrating an example of a stacked structure of the solid-state image sensor according to the present disclosure.

FIG. 2 is a diagram illustrating an example of a stacked structure of the solid-state image sensor 200 according to the present disclosure. The solid-state image sensor 200 includes a detection chip 202 and a light-receiving chip 201 stacked on the detection chip 202. These chips are bonded by a via or the like. Note that Cu—Cu bonding or bump can be used for bonding in addition to the via.

Note that the solid-state image sensor 200 is not limited to have the stacked structure illustrated in FIG. 2. The solid-state image sensor 200 may have a configuration in which a circuit element provided on the light-receiving chip 201 and a circuit element provided on the detection chip 202 are provided on one chip. The solid-state image sensor having such a configuration will be described below with reference to FIGS. 9 to 19.

Figure 3:
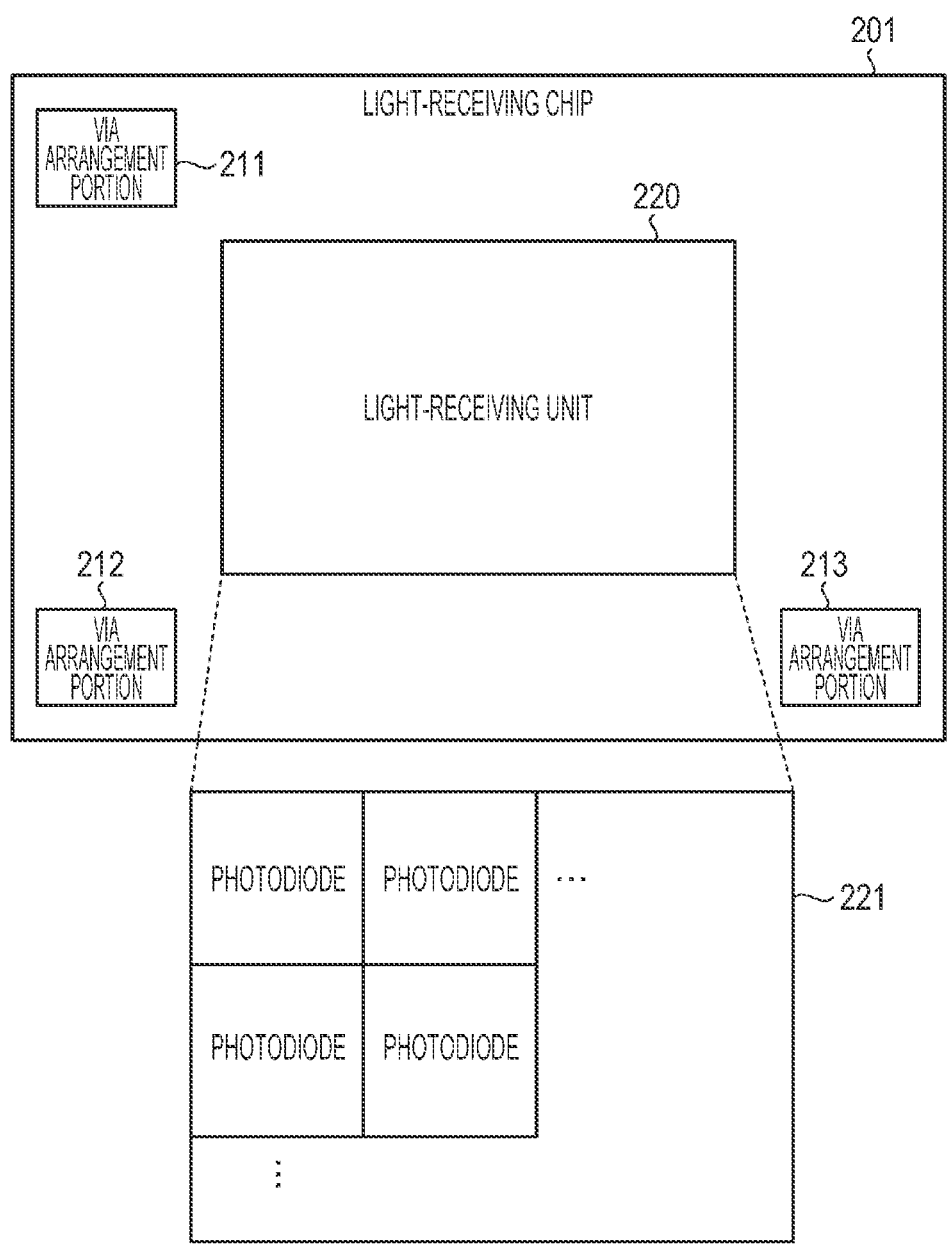
FIG. 3 is an example of a plan view of a light-receiving chip according to the present disclosure.

FIG. 3 is an example of a plan view of the light-receiving chip 201 according to the present disclosure. The light-receiving chip 201 is provided with a light-receiving unit 220 and via arrangement portions 211, 212, and 213.

Vias connected to the detection chip 202 are arranged in the via arrangement portions 211, 212, and 213. Furthermore, in the light-receiving unit 220, a plurality of photodiodes 221 is arranged in a two-dimensional lattice manner. The photodiode 221 photoelectrically converts the incident light to generate a photocurrent. Each of these photodiodes 221 is assigned a pixel address including a row address and a column address, and is treated as a pixel.

Figure 4:
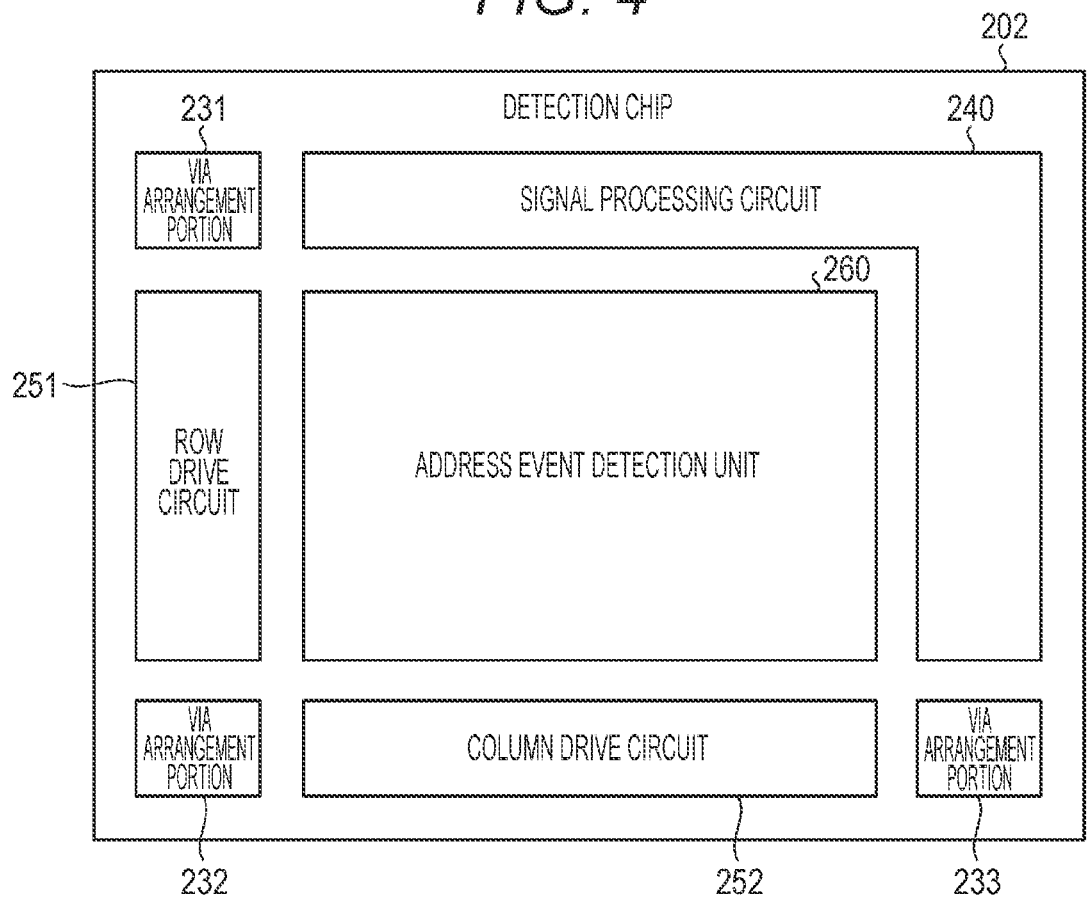
FIG. 4 is an example of a plan view of a detection chip according to the present disclosure.

FIG. 4 is an example of a plan view of the detection chip 202 according to the present disclosure. The detection chip 202 is provided with via arrangement portions 231, 232, and 233, a signal processing circuit 240, a row drive circuit 251, a column drive circuit 252, and an address event detection unit 260. Vias connected to the light-receiving chip 201 are arranged in the via arrangement portions 231, 232, and 233.

The address event detection unit 260 generates a detection signal from the photocurrent of each of the plurality of photodiodes 221 and outputs the detection signal to the signal processing circuit 240. The detection signal is a 1-bit signal indicating whether or not a light amount of the incident light having exceeded a predetermined threshold has been detected as an address event.

The row drive circuit 251 selects a row address and causes the address event detection unit 260 to output a detection signal corresponding to the row address.

The column drive circuit 252 selects a column address and causes the address event detection unit 260 to output a detection signal corresponding to the column address.

The signal processing circuit 240 executes predetermined signal processing for the detection signal from the address event detection unit 260. The signal processing circuit 240 arrays the detection signals as pixel signals in a two-dimensional lattice manner, and acquires image data having 1-bit information for each pixel. Then, the signal processing circuit 240 executes signal processing such as image recognition processing for the image data.

Figure 5:
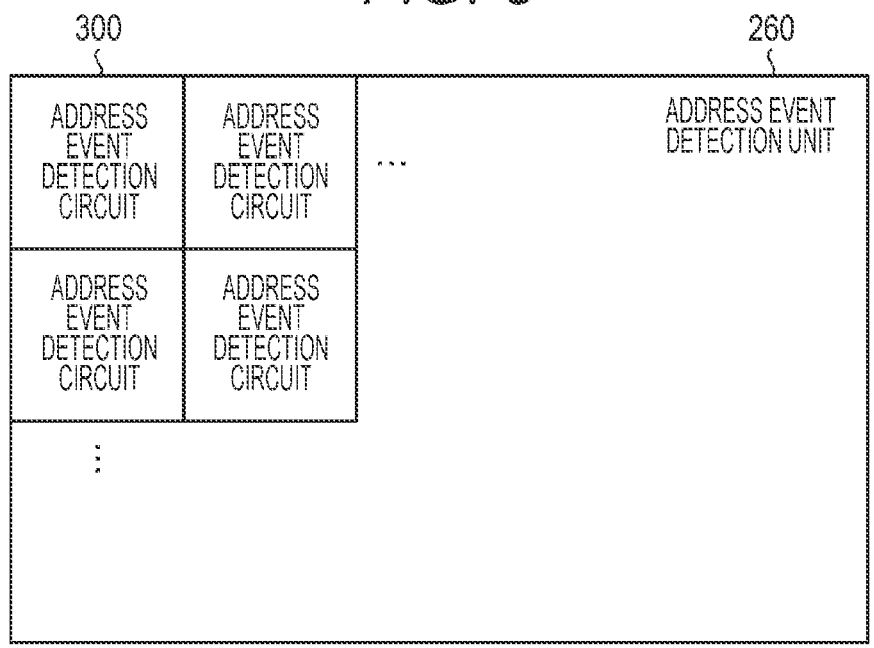
FIG. 5 is an example of a plan view of an address event detection unit according to the present disclosure.

FIG. 5 is an example of a plan view of the address event detection unit 260 according to the present disclosure. In the address event detection unit 260, a plurality of address event detection circuits 300 is arranged in a two-dimensional lattice manner. A pixel address is assigned to each of the address event detection circuits 300, and is connected to the photodiode 221 having the same address.

The address event detection circuit 300 quantizes a voltage signal corresponding to the photocurrent from the corresponding photodiode 221 and outputs the quantized voltage signal as a detection signal.

3. Configuration Example of Address Event Detection Circuit

Figure 6:
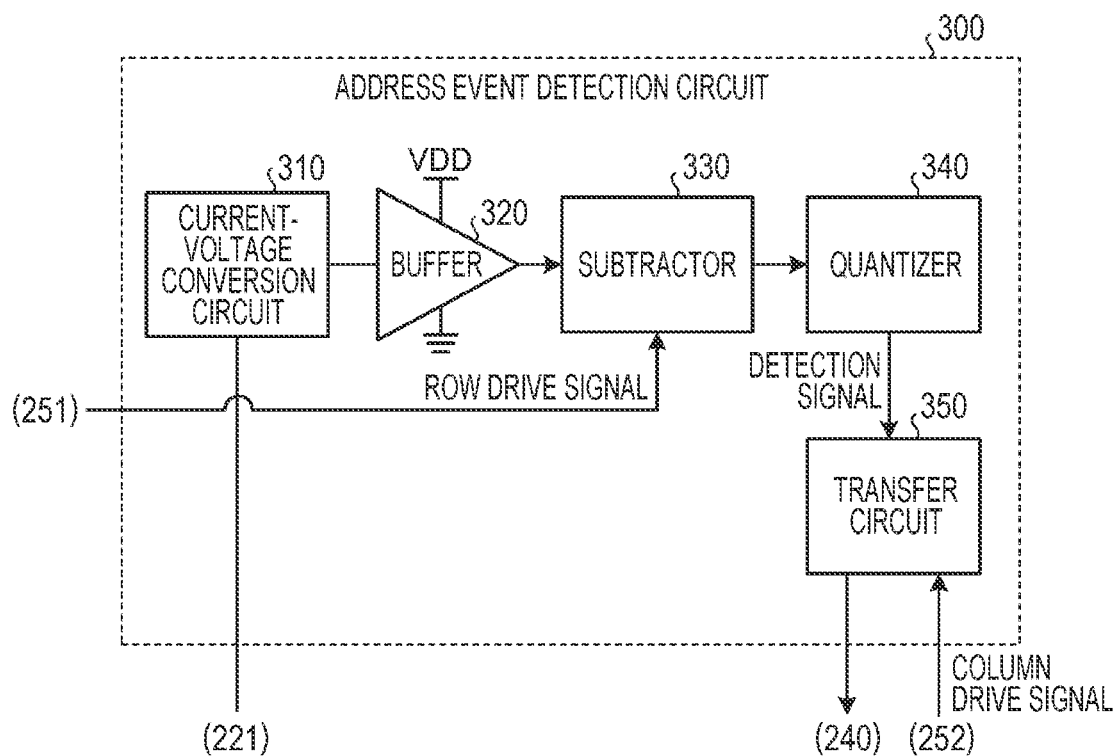
FIG. 6 is a block diagram illustrating a configuration example of an address event detection circuit according to the present disclosure.

FIG. 6 is a block diagram illustrating a configuration example of the address event detection circuit 300 according to the present disclosure. The address event detection circuit 300 includes a current-voltage conversion circuit 310, a buffer 320, a subtractor 330, a quantizer 340, and a transfer circuit 350.

The current-voltage conversion circuit 310 converts the photocurrent from the corresponding photodiode 221 into the voltage signal. The current-voltage conversion circuit 310 supplies the voltage signal to the buffer 320.

The buffer 320 corrects the voltage signal from the current-voltage conversion circuit 310. The buffer 320 outputs the corrected voltage signal to the subtractor 330.

The subtractor 330 lowers a level of the voltage signal from the buffer 320 according to a row drive signal from the row drive circuit 251. The subtractor 330 supplies the lowered voltage signal to the quantizer 340.

The quantizer 340 quantizes the voltage signal from the subtractor 330 into a digital signal and outputs the digital signal to the transfer circuit 350 as a detection signal.

The transfer circuit 350 transfers the detection signal from the quantizer 340 to the signal processing circuit 240 according to a column drive signal from the column drive circuit 252.

4. Configuration Example of Current-Voltage Conversion Circuit

Figure 7:
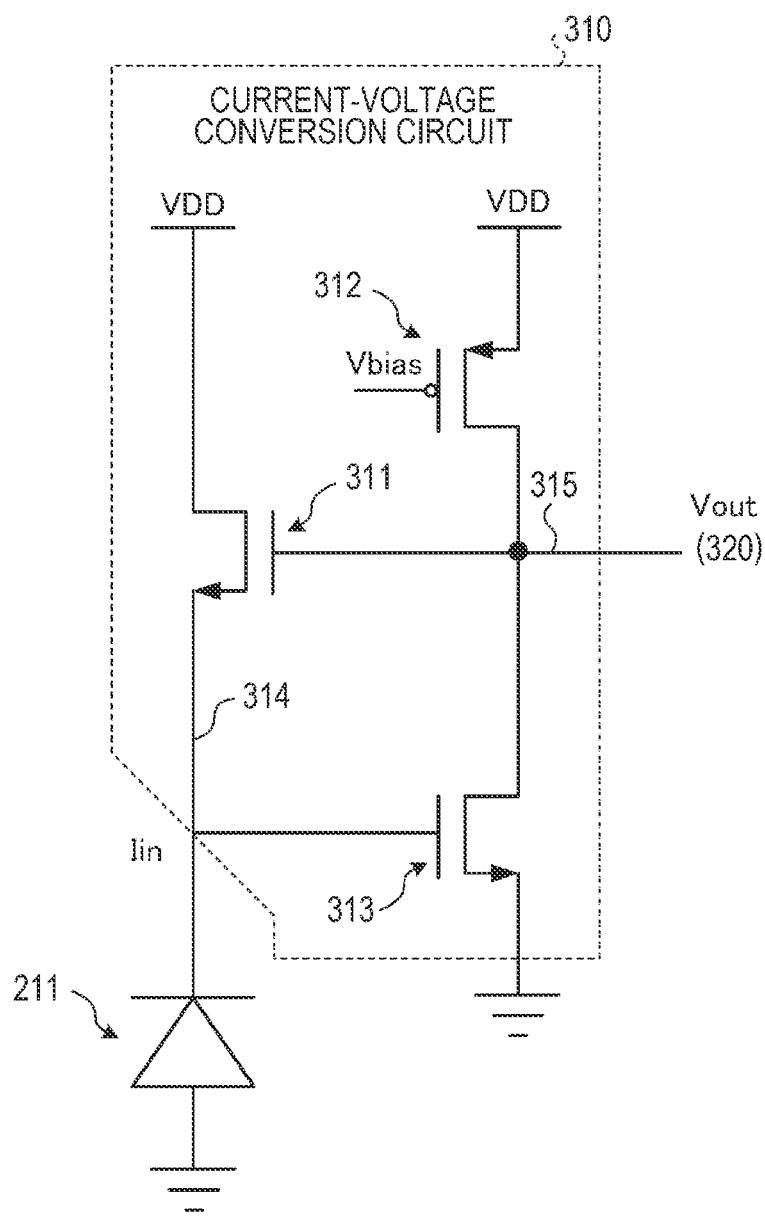
FIG. 7 is a circuit diagram illustrating a configuration example of a current-voltage conversion circuit according to the present disclosure.

FIG. 7 is a circuit diagram illustrating a configuration example of the current-voltage conversion circuit 310 according to the present technology of the present disclosure. The current-voltage conversion circuit 310 includes a conversion transistor 311, a current source transistor 312, and a voltage supply transistor 313. As the conversion transistor 311 and the voltage supply transistor 313, N-type metal-oxide-semiconductor (MOS) transistors are used, for example. Furthermore, as the current source transistor 312, a P-type MOS transistor is used, for example.

The conversion transistor 311 converts a photocurrent $I_{in}$ from the corresponding photodiode 221 into a voltage signal $V_{out}$ and outputs the voltage signal $V_{out}$ from a gate. A source of the conversion transistor 311 is connected to a cathode of the photodiode 221 and a gate of the voltage supply transistor 313 via an input signal line 314. Furthermore, a drain of the conversion transistor 311 is connected to a power supply, and the gate is connected to a drain of the current source transistor 312, a drain of the voltage supply transistor 313, and an input terminal of the buffer 320 via an output signal line 315.

The current source transistor 312 supplies a predetermined constant current to the output signal line 315. A predetermined bias current $V_{bias}$ is applied to a gate of the current source transistor 312. A source is connected to the power supply, and the drain is connected to the output signal line 315.

The voltage supply transistor 313 supplies a constant voltage according to the constant current from the output signal line 315 to the source of the conversion transistor 311 via the input signal line 314. Thereby, a source voltage of the conversion transistor 311 is fixed to a constant voltage. Therefore, when light is incident, a gate-source voltage of the conversion transistor 311 increases according to the photocurrent, and the level of the voltage signal $V_{out}$ increases.

5. Configuration Example of Subtractor and Quantizer

Figure 8A:
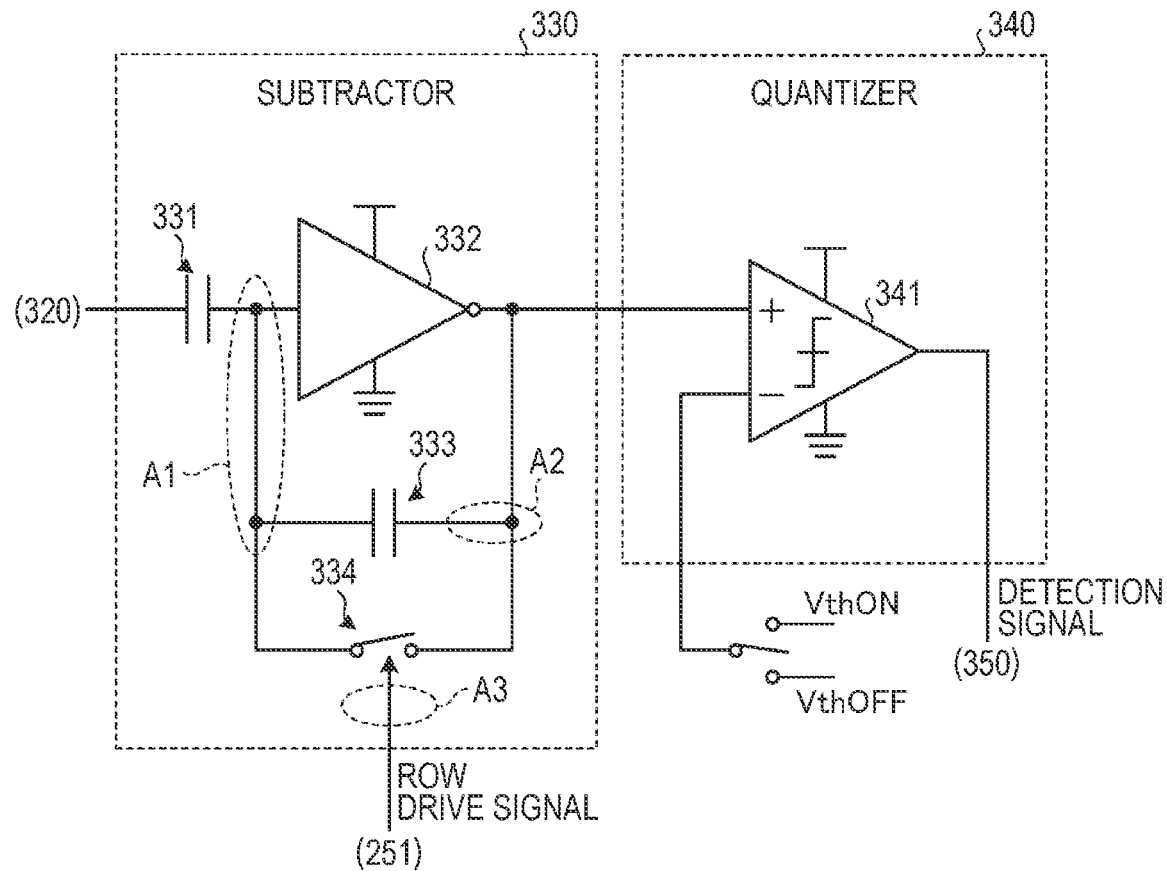
FIG. 8A is a circuit diagram illustrating a configuration example of a subtractor and a quantizer according to the present disclosure.

FIG. 8A is a circuit diagram illustrating a configuration example of the subtractor 330 and the quantizer 340 according to the present disclosure. The subtractor 330 includes capacitors 331 and 333, an inverter 332, and a switch 334. Furthermore, the quantizer 340 includes a comparator 341.

One end of the capacitor 331 is connected to an output terminal of the buffer 320, and the other end of the capacitor 331 is connected to an input terminal of the inverter 332. The capacitor 333 is connected in parallel with the inverter 332.

The switch 334 includes, for example, a metal oxide semiconductor field effect transistor (MOSFET), and opens and closes a path connecting both ends of the capacitor 333 according to the row drive signal. The switch 334 functions as a reset transistor that discharges and resets the capacitor 333 by connecting both ends of the capacitor 333.

The inverter 332 inverts the voltage signal input via the capacitor 331. The inverter 332 outputs an inverted signal to a non-inverting input terminal (+) of the comparator 341.

The comparator 341 is, for example, an inverting amplifier, and functions as a luminance change detection circuit that detects a change in luminance of incident light incident on the photodiode 221 on the basis of the voltage signal input from the subtractor 330.

The comparator 341 detects a change in luminance of the incident light by comparing the voltage signal from the subtractor 330 with predetermined threshold voltages VthON and VthOFF applied to the inverting input terminal (−). The comparator 341 outputs a signal indicating a comparison result to the transfer circuit 350 as a detection signal.

For example, in a case where the imaging device 100 is used for face authentication, the comparator 341 switches the threshold voltages VthON and VthOFF input in synchronization with a blinking cycle of a light source that irradiates a face serving as an object with blinking light. The comparator 341 compares the input voltage signal with the threshold voltage VthON during a period in which the light source is lit. Furthermore, the comparator 341 compares the input voltage signal with the threshold voltage VthOFF during a period in which the light source is off.

Figure 8B:
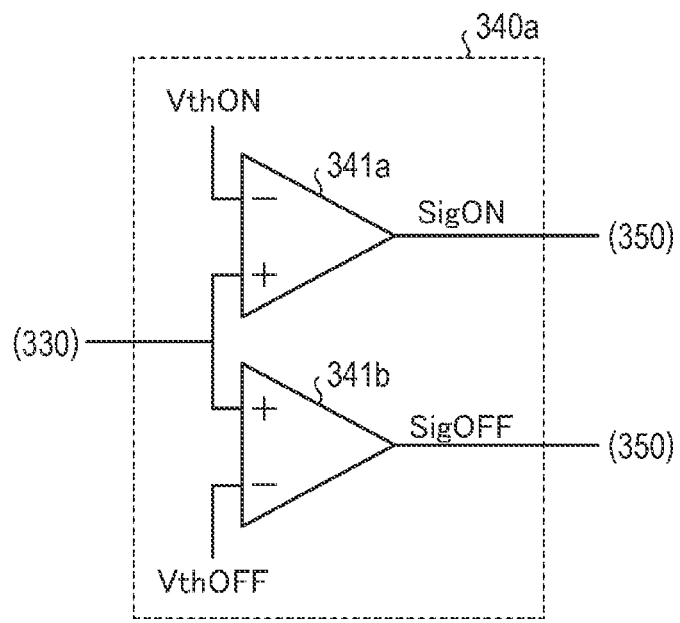
FIG. 8B is a circuit diagram illustrating a modification of the quantizer according to the present disclosure.

Note that the configuration of the quantizer 340 is not limited to the configuration illustrated in FIG. 8A, and may be, for example, the configuration illustrated in FIG. 8B. FIG. 8 is a circuit diagram illustrating a modification of the quantizer according to the present disclosure. As illustrated in FIG. 8B, a quantizer 340a according to the modification includes two comparators 341a and 341b connected in parallel to the input.

The voltage signal is input from the subtractor 330 to non-inverting input terminals (+) of the comparators 341a and 341b. The threshold voltage VthON is input to an inverting input terminal (−) of the comparator 341a. The threshold voltage VthOFF is input to an inverting input terminal (−) of the comparator 341b.

The comparator 341a outputs a detection signal SigON indicating a comparison result between the voltage signal and the threshold voltage VthON to the transfer circuit 350. The comparator 341b outputs a detection signal SigOFF indicating a comparison result between the voltage signal and the threshold voltage VthOFF to the transfer circuit 350.

By the quantizer 340a having such a configuration, it is possible to detect a change in luminance of the incident light incident on the photodiode 221 on the basis of the voltage signal input from the subtractor 330 and output a detection result to the transfer circuit 350, similarly to the quantizer 340 illustrated in FIG. 8A.

Here, in the quantizer 340 or 340a, when parasitic light sensitivity (PLS) of the subtractor 330 is high, the voltage of the input voltage signal varies due to irradiation of the subtractor 330 with stray light or diffusion of light-generated charges, and the detection accuracy of the luminance change decreases.

For example, in the case of the configuration illustrated in FIG. 8A, when irradiation of stray light or diffusion of light-generated charges occurs in impurity diffusion regions A1 and A2 connected to the capacitors 331 and 333 included in the subtractor 330, photoelectric conversion occurs, and the voltage of the voltage signal input to the quantizer 340 varies.

Furthermore, when irradiation of stray light or diffusion of light-generated charges occurs in an impurity diffusion region A3 connected to the gate of the switch 334, a switching operation of the switch 334 becomes abnormal, and the voltage of the voltage signal input to the quantizer 340 may vary.

Therefore, the solid-state image sensor 200 according to the present disclosure includes a light-shielding unit that shields incidence of light on the impurity diffusion region included in the subtractor 330 that is an example of a circuit that inputs the voltage signal to the quantizer 340 or 340a that is an example of the luminance change detection circuit.

As a result, the solid-state image sensor 200 can suppress a decrease in the detection accuracy of a luminance change due to irradiation of stray light or diffusion of light-generated charges. Hereinafter, a specific example of the solid-state image sensor 200 including the light-shielding unit according to the present disclosure will be described.

Note that the light-shielding unit according to the present disclosure can be applied to a solid-state image sensor other than the stacked solid-state image sensor 200 in which the light-receiving chip 201 is stacked on the detection chip 202 illustrated in FIG. 2. For example, the light-shielding unit according to the present disclosure is also applicable to a front-illuminated solid-state image sensor and a back-illuminated solid-state image sensor in which a circuit element provided on the light-receiving chip 201 and a circuit element provided on the detection chip 202 are provided on one chip.

Therefore, hereinafter, each of a front-illuminated solid-state image sensor, a back-illuminated solid-state image sensor, and a stacked solid-state image sensor including the light-shielding unit according to the present disclosure will be described.

6. Front-illuminated Solid-State Imaging Device

[6-1. First Front-Illuminated Solid-State Imaging Device]

Figure 9:
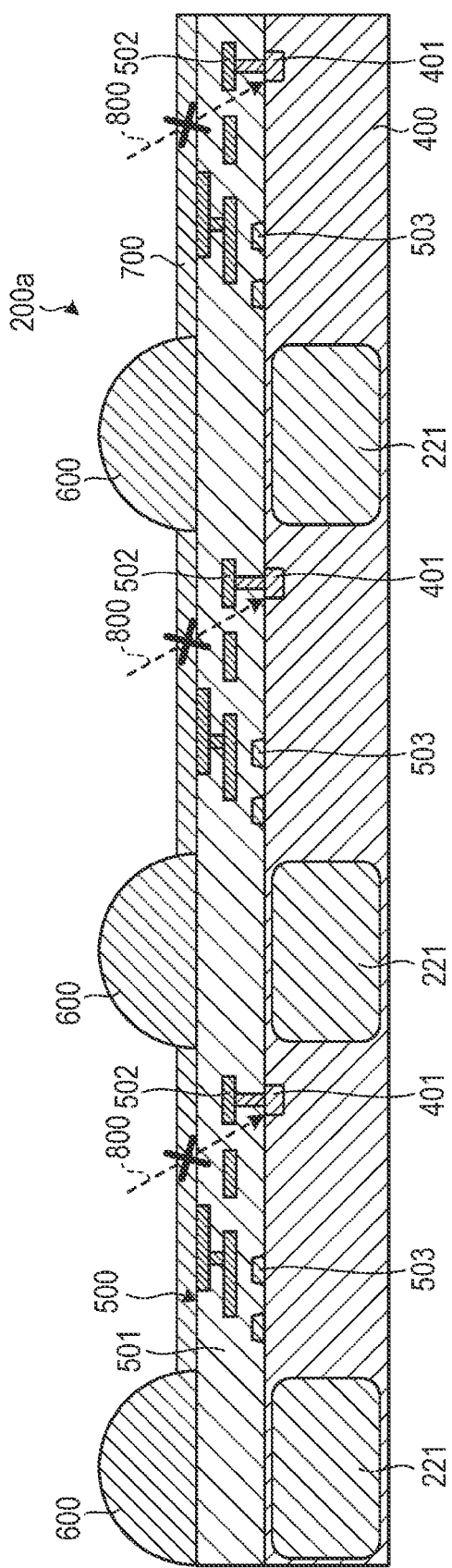
FIG. 9 is an explanatory cross-sectional view illustrating a configuration of a first front-illuminated solid-state image sensor according to the present disclosure.
Figure 10:
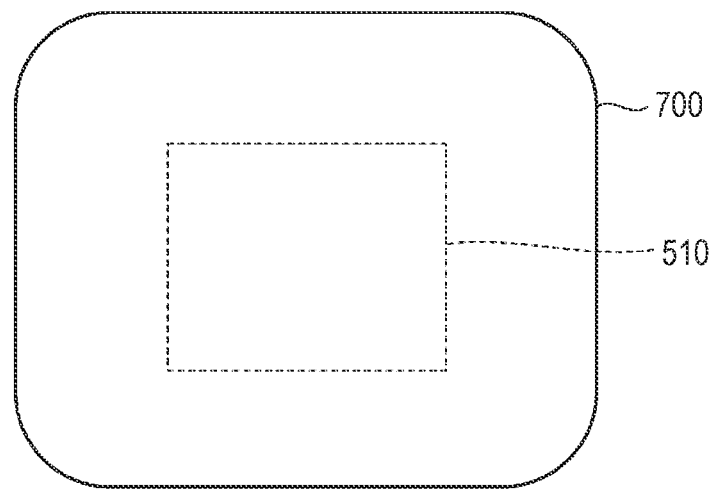
FIG. 10 is an explanatory plan view illustrating a positional relationship between a light-shielding film and an object to be light-shielded included in the first front-illuminated solid-state image sensor according to the present disclosure.
Figure 11:
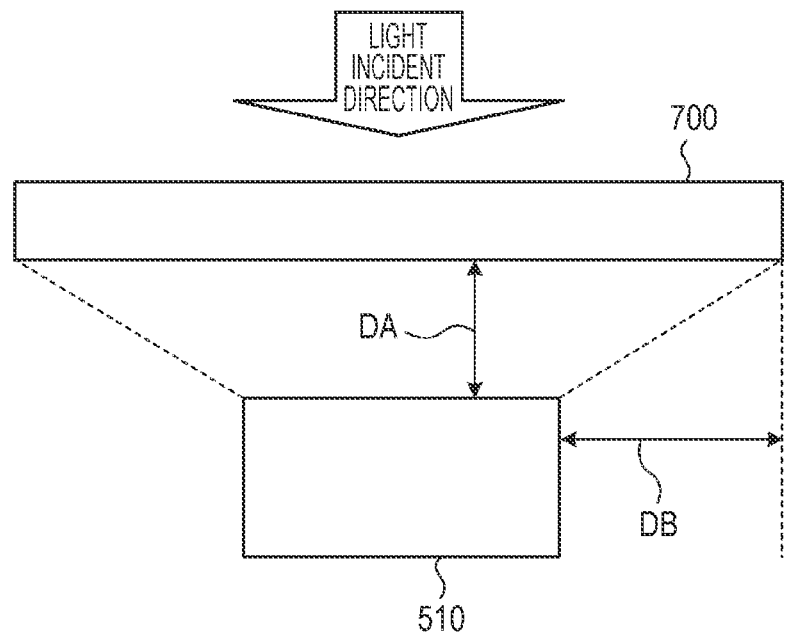
FIG. 11 is an explanatory side view illustrating a positional relationship between the light-shielding film and the object to be light-shielded included in the first front-illuminated solid-state image sensor according to the present disclosure.

First, a first front-illuminated solid-state image sensor according to the present disclosure will be described with reference to FIGS. 9 to 11. FIG. 9 is an explanatory cross-sectional view illustrating a configuration of the first front-illuminated solid-state image sensor according to the present disclosure. FIG. 10 is an explanatory plan view illustrating a positional relationship between a light-shielding film and an object to be light-shielded included in the first front-illuminated solid-state image sensor according to the present disclosure. FIG. 11 is an explanatory side view illustrating a positional relationship between the light-shielding film and the object to be light-shielded included in the first front-illuminated solid-state image sensor according to the present disclosure. Note that, hereinafter, a light-incident surface side of the solid-state image sensor is an upper side, and a surface side opposite to the light-incident surface is a lower side for convenience.

As illustrated in FIG. 9, the first front-illuminated solid-state image sensor (hereinafter referred to as a solid-state image sensor 200a) is provided with an on-chip lens 600 on a light-incident surface side of a semiconductor layer 400 including the photodiode 221 via a wiring layer 500.

The semiconductor layer 400 is, for example, a silicon (Si) substrate doped with a P-type impurity such as boron (B). The photodiode 221 is a region in which an N-type impurity such as phosphorus (P) is diffused in the semiconductor layer 400.

The wiring layer 500 includes, for example, an interlayer insulating film 501 such as a silicon oxide ($SiO_2$) film and multilayer wiring 502 provided inside the interlayer insulating film 501. Furthermore, for example, gate electrodes 503 of various transistors and the like included in the address event detection circuit 300 are provided in a surface side of the wiring layer 500, the surface side being bonded to the semiconductor layer 400.

Furthermore, for example, the impurity diffusion region 401 included in the address event detection circuit 300 is provided on a surface side of the semiconductor layer 400, the surface side being bonded to the wiring layer 500. For example, in the case where the impurity diffusion region 401 is a region in which an N-type impurity such as phosphorus (P) is diffused, a PN junction is formed between the impurity diffusion region and the semiconductor layer 400.

Therefore, when light 800 passing through the wiring layer 500 is irradiated as stray light, the impurity diffusion region 401 photoelectrically converts the light 800. In a case where the impurity diffusion region 401 is the above-described impurity diffusion region A1, A2, or A3 included in the subtractor 330, the impurity diffusion region varies the voltage of the voltage signal output from the subtractor 330 to the quantizer 340, and lowers the detection accuracy of the luminance change by the quantizer 340.

Therefore, the solid-state image sensor 200a includes a light-shielding film 700 that covers a light-incident-side surface of the wiring layer 500 as a light-shielding unit that shields incidence of the light 800 on the impurity diffusion region 401. Thereby, the solid-state image sensor 200a can prevent the light 800 from entering the impurity diffusion region 401, thereby suppressing a decrease in the detection accuracy of the luminance change due to irradiation of stray light.

Furthermore, as illustrated in FIG. 10, the light-shielding film 700 is provided at a position overlapping with a circuit block 510 including the impurity diffusion region 401, and has a size enclosing the circuit block 510 in plan view. That is, the light-shielding film 700 covers the circuit block 510 with a coverage of 100% or more. Note that the circuit block 510 may be the impurity diffusion region 401 itself or a region including the plurality of impurity diffusion regions 401. As a result, the light-shielding film 700 can prevent the light 800, which tries to enter the light-incident-side surface of the wiring layer 500 from a vertical direction, from entering the impurity diffusion region 401.

Furthermore, as illustrated in FIG. 11, the light-shielding film 700 is formed such that a protrusion width DB from an outer periphery of the circuit block 510 in side view is equal to or larger than a distance DA in an up-down direction with respect to the circuit block 510 in side view. As a result, the light-shielding film 700 can prevent the light 800, which tries to be incident from an oblique direction, from entering the impurity diffusion region 401.

[6-2. Second Front-Illuminated Solid-State Image Sensor]

Figure 12:
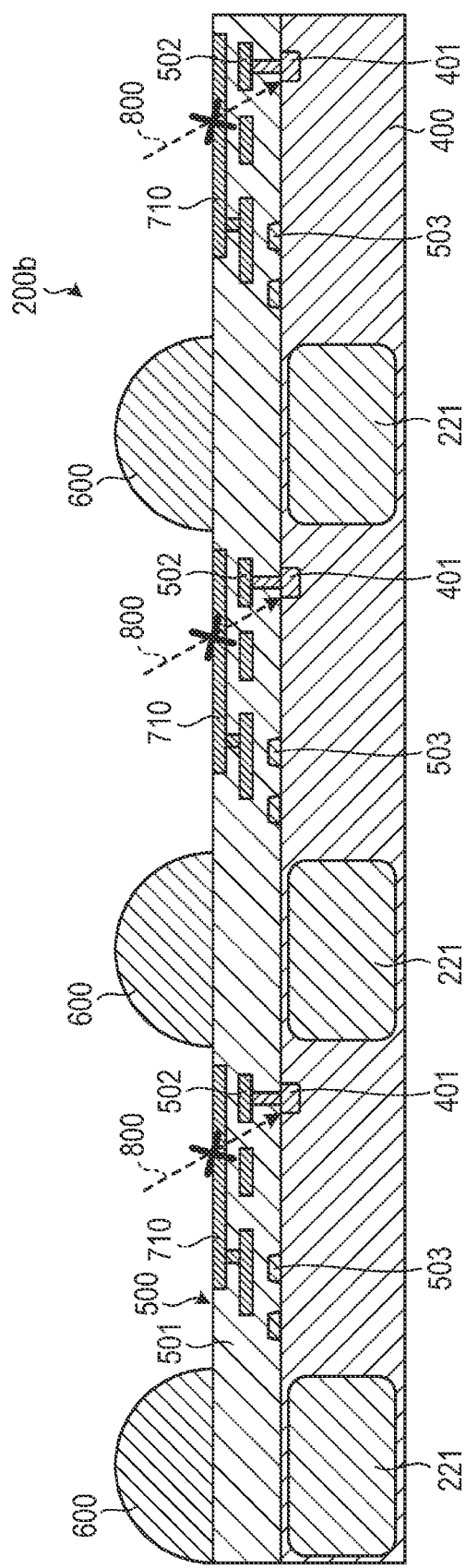
FIG. 12 is an explanatory cross-sectional view illustrating a configuration of a second front-illuminated solid-state image sensor according to the present disclosure.
Figure 13:
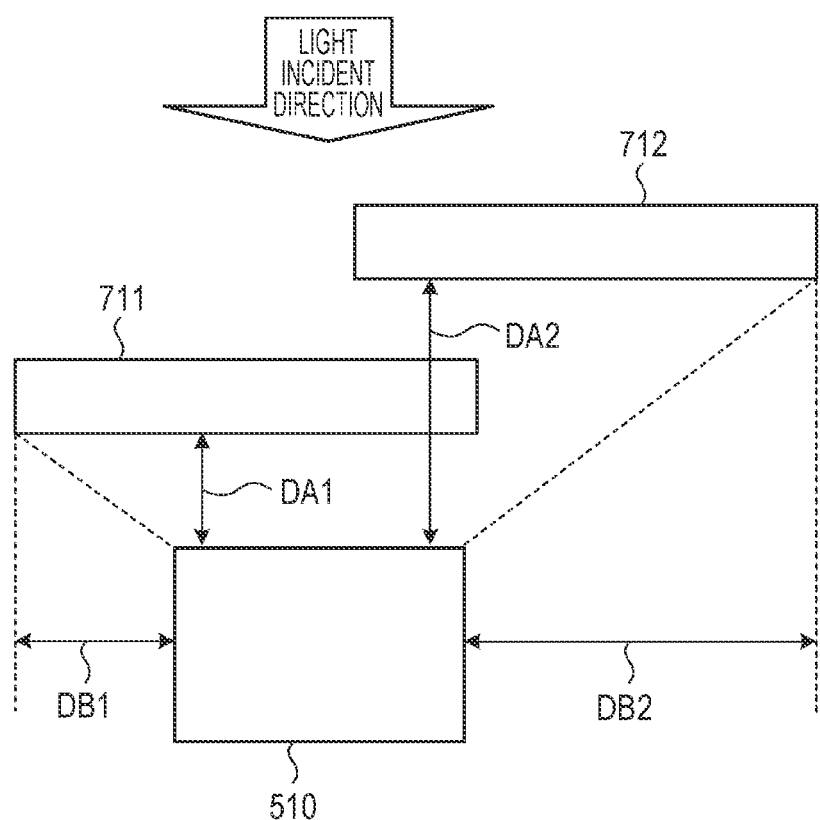
FIG. 13 is an explanatory side view illustrating a positional relationship between light-shielding wiring and an object to be light-shielded included in the second front-illuminated solid-state image sensor according to the present disclosure.

Next, a second front-illuminated solid-state image sensor according to the present disclosure will be described with reference to FIGS. 12 and 13. In the following description, special wiring provided in the solid-state image sensor for the purpose of shielding light is referred to as light-shielding wiring. FIG. 12 is an explanatory cross-sectional view illustrating a configuration of the second front-illuminated solid-state image sensor according to the present disclosure. FIG. 13 is an explanatory side view illustrating a positional relationship between the light-shielding wiring and the object to be light-shielded included in the second front-illuminated solid-state image sensor according to the present disclosure.

As illustrated in FIG. 12, the second front-illuminated solid-state image sensor (hereinafter referred to as a solid-state image sensor 200b) includes light-shielding wiring 710 in the wiring layer 500 instead of the light-shielding film 700 illustrated in FIG. 10.

The relationship in position and size between the light-shielding wiring 710 and the circuit block 510 (see FIG. 10) in plan view is similar to the relationship in position and size between the light-shielding film 700 and the circuit block 510 illustrated in FIG. 10. Furthermore, the relationship in position and size between the light-shielding wiring 710 and the circuit block 510 (see FIG. 11) in side view is similar to the relationship in position and size between the light-shielding film 700 and the circuit block 510 illustrated in FIG. 11.

Specifically, the light-shielding wiring 710 is provided at a position overlapping with the circuit block 510 including the impurity diffusion region 401, and has a size enclosing the circuit block 510 in plan view. That is, the light-shielding wiring 710 covers the circuit block 510 with a coverage of 100% or more.

Note that the circuit block 510 may be the impurity diffusion region 401 itself or a region including the plurality of impurity diffusion regions 401. As a result, the light-shielding wiring 710 can prevent the light 800, which tries to enter the light-incident-side surface of the wiring layer 500 from the vertical direction, from entering the impurity diffusion region 401.

Furthermore, in the light-shielding wiring 710, the protrusion width from the outer periphery of the circuit block 510 in side view is equal to or larger than the distance to the circuit block 510 in side view. As a result, the light-shielding wiring 710 can prevent the light 800, which tries to be incident from an oblique direction, from entering the impurity diffusion region 401.

The light-shielding wiring 710 can be formed at the same time, for example, in a process of forming wiring closest to the light-incident-side surface of the wiring layer 500. Therefore, the light-shielding wiring 710 can be formed without adding a new process in order to shield the impurity diffusion region 401.

Furthermore, in the example illustrated in FIG. 12, the light-shielding wiring 710 and another wiring 502 are connected. That is, the light-shielding wiring 710 is wiring used for driving a circuit. Therefore, the light-shielding wiring 710 can be formed without adding a new process only by changing design of a pattern of the existing wiring 502 used for driving the circuit.

Note that the light-shielding wiring 710 is not necessarily connected to the another wiring 502. That is, the light-shielding wiring 710 may be dummy wiring that is not involved in driving the circuit. The light 800 can also be prevented from entering the impurity diffusion region 401 by the light-shielding wiring 710 as the dummy wiring.

Furthermore, in the example illustrated in FIG. 12, a light-shielding unit is configured by the single-layer light-shielding wiring 710, but the light-shielding unit may be configured by a plurality of layers of the light-shielding wiring. For example, as illustrated in FIG. 13, the light-shielding unit may be configured by first light-shielding wiring 711 and second light-shielding wiring 712 that are formed in different layers and at least partially overlap in plan view.

With such a configuration, the first light-shielding wiring 711 is formed such that a protrusion width DB1 from the outer periphery of the circuit block 510 in side view is equal to or larger than a distance DA1 in the up-down direction with respect to the circuit block 510 in side view. Furthermore, the second light-shielding wiring 712 is formed such that a protrusion width DB2 from the outer periphery of the circuit block 510 in side view is equal to or larger than a distance DA2 in the up-down direction with respect to the circuit block 510 in side view.

As a result, the first light-shielding wiring 711 and the second light-shielding wiring 712 can prevent the light 800, which tries to be incident from an oblique direction, from entering the impurity diffusion region 401. Note that a light-shielding unit may be configured by three or more layers of light-shielding wiring at least partially overlapping in plan view.

[6-3. Third Front-Illuminated Solid-State Image Sensor]

Figure 14:
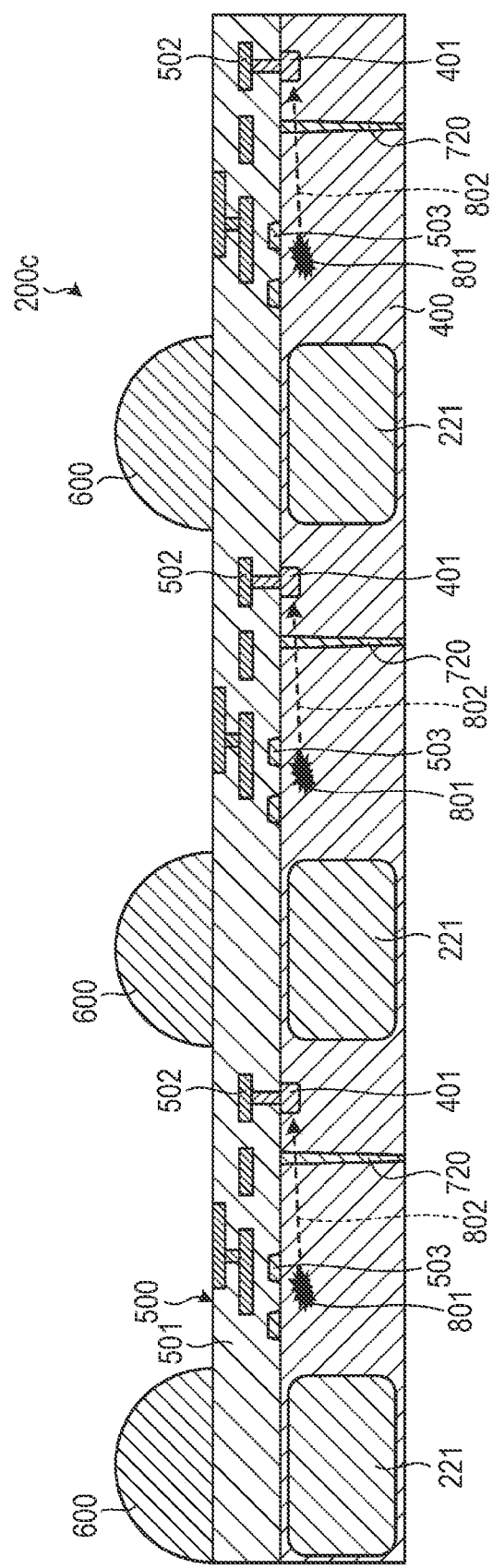
FIG. 14 is an explanatory cross-sectional view illustrating a configuration of a third front-illuminated solid-state image sensor according to the present disclosure.
Figure 15:
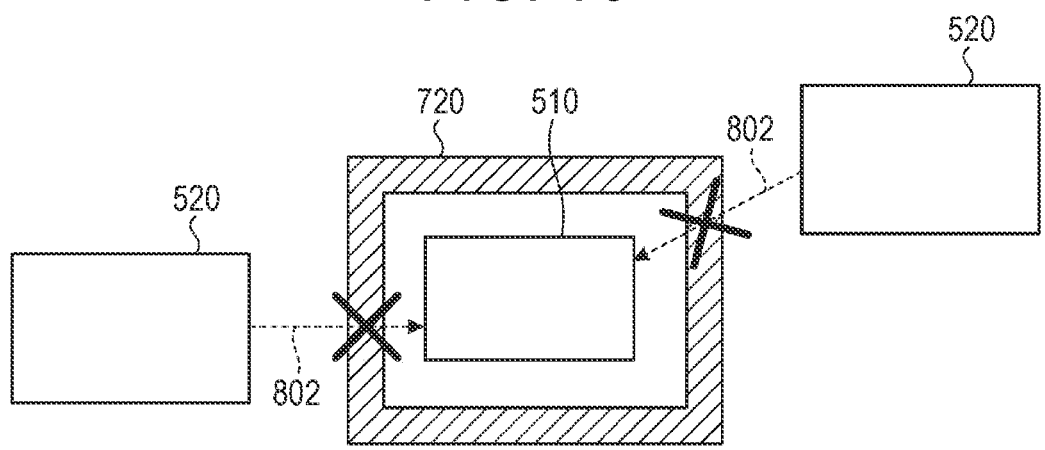
FIG. 15 is an explanatory plan view illustrating a positional relationship between a light-shielding member and an object to be light-shielded included in the third front-illuminated solid-state image sensor according to the present disclosure.
Figure 16:
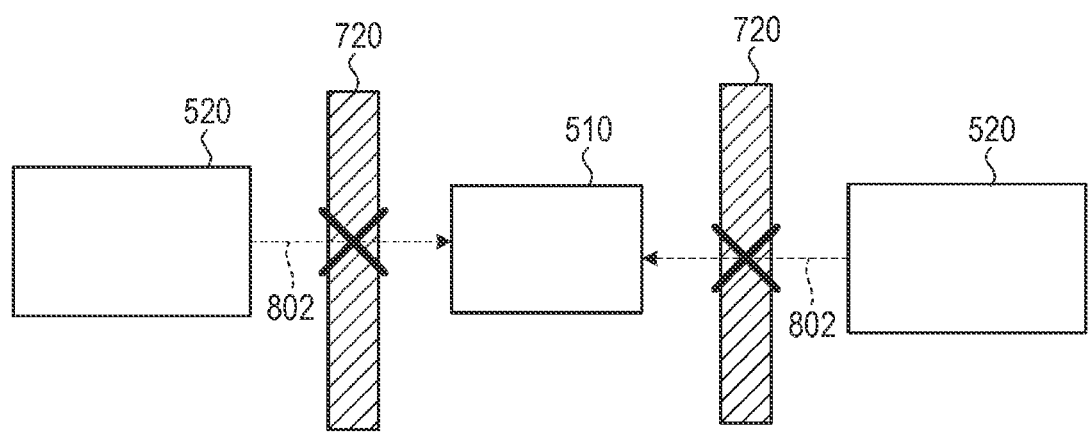
FIG. 16 is an explanatory side view illustrating a positional relationship between the light-shielding member and the object to be light-shielded included in the third front-illuminated solid-state image sensor according to the present disclosure.

Next, a third front-illuminated solid-state image sensor according to the present disclosure will be described with reference to FIGS. 14 to 16. FIG. 14 is an explanatory cross-sectional view illustrating a configuration of the third front-illuminated solid-state image sensor according to the present disclosure. FIG. 15 is an explanatory plan view illustrating a positional relationship between a light-shielding member and the object to be light-shielded included in the third front-illuminated solid-state image sensor according to the present disclosure. FIG. 16 is an explanatory side view illustrating a positional relationship between the light-shielding member and the object to be light-shielded included in the third front-illuminated solid-state image sensor according to the present disclosure.

As illustrated in FIG. 14, in the third front-illuminated solid-state image sensor (hereinafter referred to as a solid-state image sensor 200c), a light emission phenomenon (hereinafter referred to as HC light emission 801) associated with generation of hot carriers occurs near the gate electrode 503 of the transistor having a relatively large current amount inside the semiconductor layer 400.

The impurity diffusion region 401 photoelectrically converts light 802 when irradiated with the light 802 by the HC light emission 801. In a case where the impurity diffusion region 401 is the above-described impurity diffusion region A1, A2, or A3 included in the subtractor 330, the impurity diffusion region varies the voltage of the voltage signal output from the subtractor 330 to the quantizer 340, and lowers the detection accuracy of the luminance change by the quantizer 340.

Therefore, the solid-state image sensor 200c includes a light-shielding member 720 embedded in a trench provided between an active element that emits light by hot carriers and the impurity diffusion region 401 as a light-shielding unit that shields incidence of the light 802 on the impurity diffusion region 401.

The light-shielding member 720 is, for example, tungsten (W). Thereby, the solid-state image sensor 200c can prevent the light 802 from entering the impurity diffusion region 401, thereby suppressing a decrease in the detection accuracy of the luminance change due to irradiation of stray light.

Furthermore, as illustrated in FIG. 15, the light-shielding member 720 is provided so as to surround the periphery of the circuit block 510 including the impurity diffusion region 401 in plan view, for example. Note that the circuit block 510 may be the impurity diffusion region 401 itself or a region including the plurality of impurity diffusion regions 401.

Furthermore, as illustrated in FIG. 16, the light-shielding member 720 extends from a position shallower than a shallowest surface in the circuit block 510 and a circuit block 520 including the active element that emits light to a position deeper than a deepest surface in side view. Note that the circuit block 520 may be an active element that emits light itself or may be a region including the active element that emits light.

As a result, the light-shielding member 720 can prevent the light 802 emitted from the circuit block 520 including the active element that emits light by hot carriers from entering the impurity diffusion region 401.

Note that the light-shielding member 720 embedded in the trench does not necessarily completely surround the periphery of the circuit block 510 in plan view. The light-shielding member 720 can prevent the light 802 from entering the impurity diffusion region 401 as long as the light-shielding member is provided at least between the circuit block 510 and the circuit block 520.

Furthermore, the configurations of the solid-state image sensors 200a, 200b, and 200c illustrated in FIGS. 9 to 16 are examples of the solid-state image sensor according to the present disclosure. The solid-state image sensor according to the present disclosure may include all of the light-shielding film 700, the light-shielding wiring 710, 711, and 712, and the light-shielding member 720, or a combination of some light-shielding units.

7. Back-Illuminated Solid-State Image Sensor

[7-1. First Back-Illuminated Solid-State Image Sensor]

Figure 17:
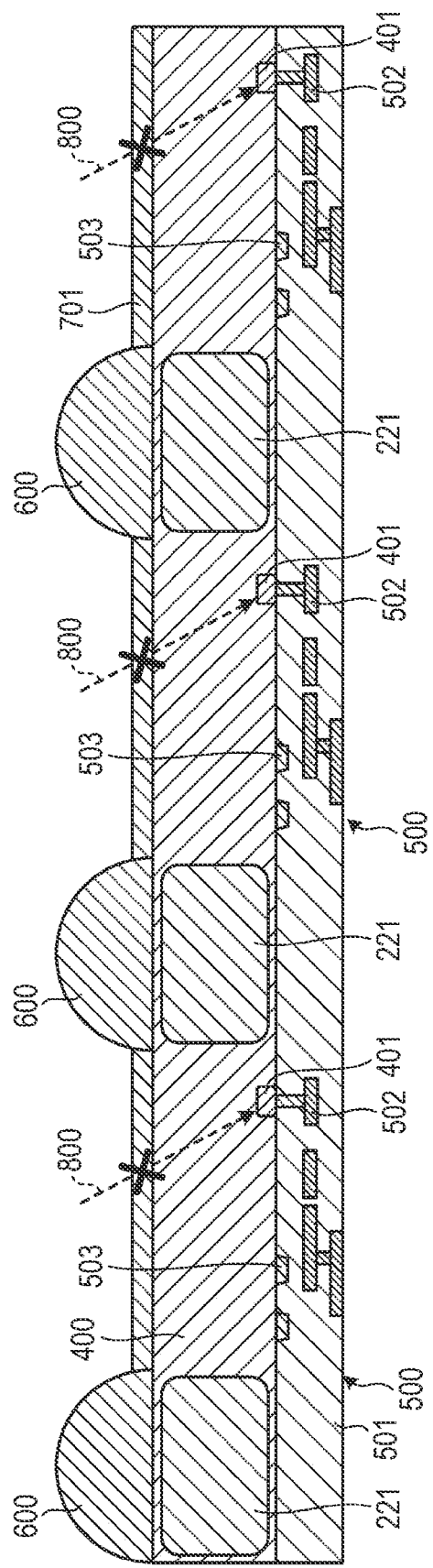
FIG. 17 is an explanatory cross-sectional view illustrating a configuration of a first back-illuminated solid-state image sensor according to the present disclosure.

Next, a first back-illuminated solid-state image sensor according to the present disclosure will be described with reference to FIG. 17. FIG. 17 is an explanatory cross-sectional view illustrating a configuration of the first back-illuminated solid-state image sensor according to the present disclosure. As illustrated in FIG. 17, the first back-illuminated solid-state image sensor (hereinafter referred to as a solid-state image sensor 200d) is provided with the wiring layer 500 on an opposite surface side to the surface of the semiconductor layer 400 including the photodiode 221 on which the light 800 is incident.

Then, in the solid-state image sensor 200d, the impurity diffusion region 401 is provided on a surface side of the semiconductor layer 400, the surface side being bonded to the wiring layer 500. In such a solid-state image sensor 200d, when the light 800 incident from the light-incident surface of the semiconductor layer 400 enters the impurity diffusion region 401, photoelectric conversion occurs in the impurity diffusion region 401, and the detection accuracy of the luminance change decreases.

Therefore, the solid-state image sensor 200d includes a light-shielding film 701 that covers the light-incident-side surface of the semiconductor layer 400. Thereby, the solid-state image sensor 200d can prevent the light 800 from entering the impurity diffusion region 401, thereby suppressing a decrease in the detection accuracy of the luminance change due to irradiation of stray light.

Furthermore, the relationship in position and size between the light-shielding film 701 and the circuit block 510 including the impurity diffusion region 401 (see FIG. 10) in plan view is similar to the relationship in position and size between the light-shielding film 700 and the circuit block 510 illustrated in FIG. 10. Furthermore, the relationship in position and size between the light-shielding film 701 and the circuit block 510 (see FIG. 11) in side view is similar to the relationship in position and size between the light-shielding film 700 and the circuit block 510 illustrated in FIG. 11.

As a result, the light-shielding film 701 can suppress a decrease in the detection accuracy of the luminance change by preventing the light 800, which tries to enter the light-incident-side surface of the semiconductor layer 400 from the vertical direction and the oblique direction, from entering the impurity diffusion region 401.

[7-2. Second Back-Illuminated Solid-State Image Sensor]

Figure 18:
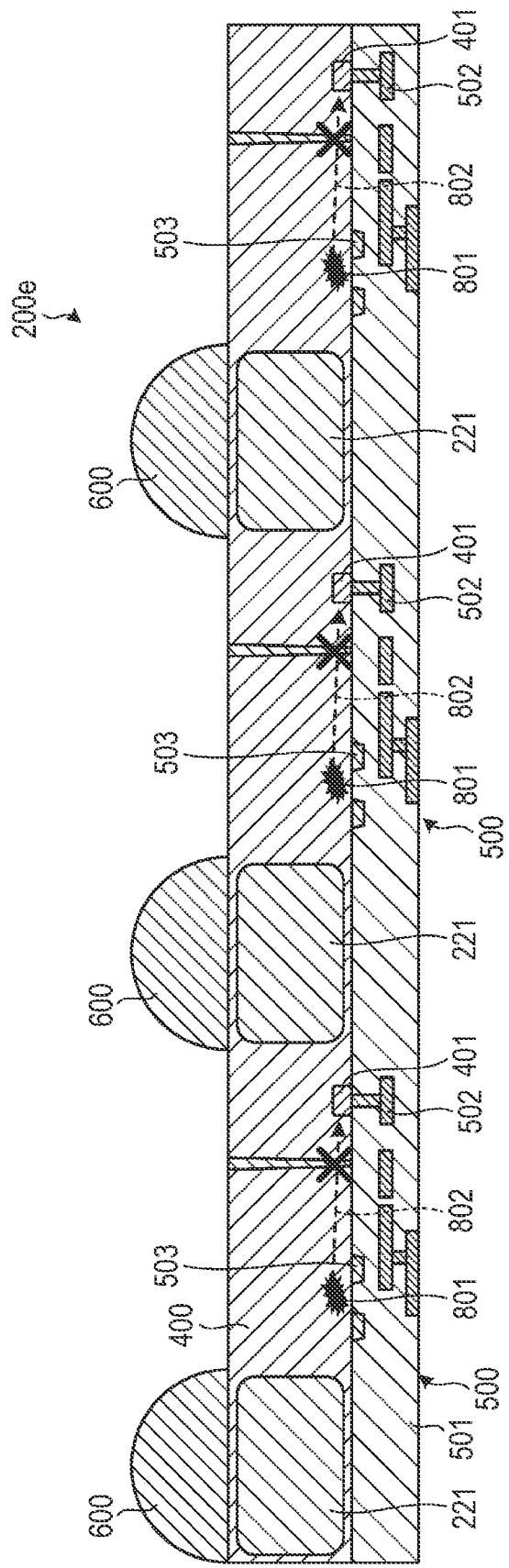
FIG. 18 is an explanatory cross-sectional view illustrating a configuration of a second back-illuminated solid-state image sensor according to the present disclosure.

Next, a second back-illuminated solid-state image sensor according to the present disclosure will be described with reference to FIG. 18. FIG. 18 is an explanatory cross-sectional view illustrating a configuration of the second back-illuminated solid-state image sensor according to the present disclosure. As illustrated in FIG. 18, in the second back-illuminated solid-state image sensor (hereinafter referred to as a solid-state image sensor 200e), the HC light emission 801 occurs near the gate electrode 503 of the transistor having a relatively large current amount inside the semiconductor layer 400.

In such a solid-state image sensor 200e, when the light 802 by the HC light emission 801 enters the impurity diffusion region 401, photoelectric conversion occurs in the impurity diffusion region 401, and the detection accuracy of the luminance change decreases. Therefore, the solid-state image sensor 200e includes a light-shielding member 730 embedded in a trench formed between an active element that emits the HC light emission 801 by hot carriers and the impurity diffusion region 401 as a light-shielding unit that shields incidence of the light 802 on the impurity diffusion region 401.

Thereby, the solid-state image sensor 200e can prevent the light 802 by the HC light emission 801 from entering the impurity diffusion region 401, thereby suppressing a decrease in the detection accuracy of the luminance change.

[7-3. Third Back-Illuminated Solid-State Image Sensor]

Figure 19:
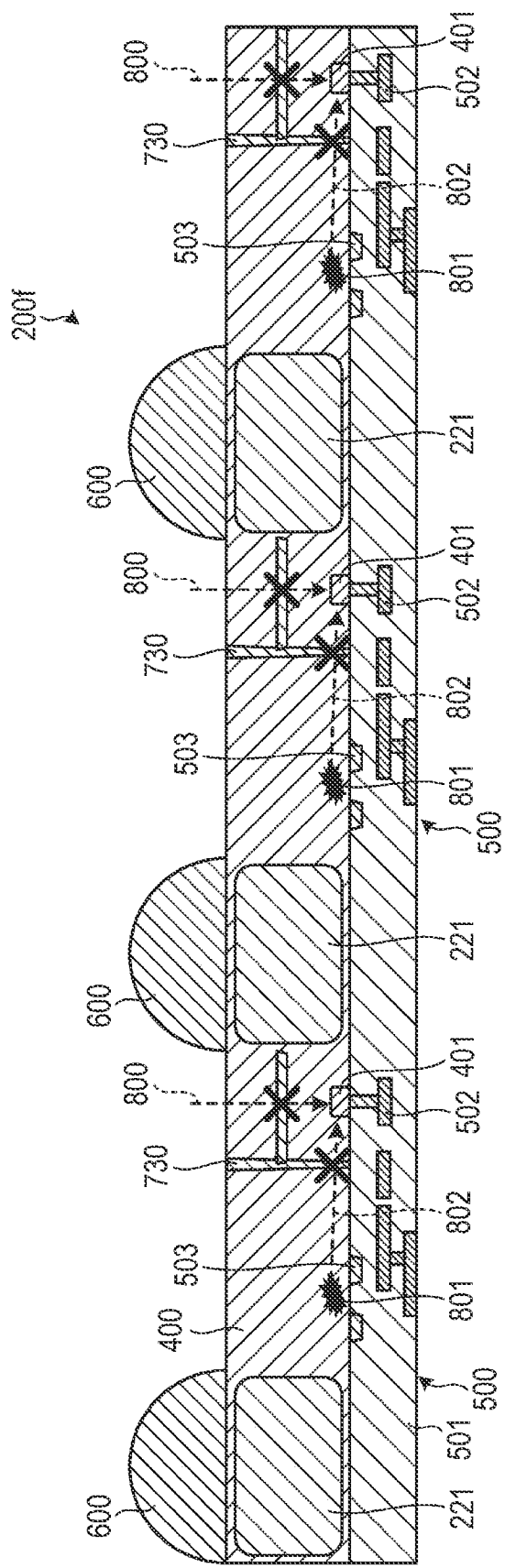
FIG. 19 is an explanatory cross-sectional view illustrating a configuration of a third back-illuminated solid-state image sensor according to the present disclosure.

Next, a third back-illuminated solid-state image sensor according to the present disclosure will be described with reference to FIG. 19. FIG. 19 is an explanatory cross-sectional view illustrating a configuration of the third back-illuminated solid-state image sensor according to the present disclosure. As illustrated in FIG. 19, the third back-illuminated solid-state image sensor (hereinafter referred to as a solid-state image sensor 200f) includes, in addition to the light-shielding member 730, a light-shielding member 731 embedded in a trench provided between the impurity diffusion region 401 and the light-incident-side surface of the semiconductor layer 400.

The light-shielding member 731 is provided to cover the impurity diffusion region 401 in plan view. As a result, the solid-state image sensor 200f can suppress a decrease in the detection accuracy of the luminance change by preventing the light 800, which tries to enter the light-incident-side surface of the semiconductor layer 400, from entering the impurity diffusion region 401.

Furthermore, the configurations of the solid-state image sensors 200d, 200e, and 200f illustrated in FIGS. 17 to 19 are examples of the solid-state image sensor according to the present disclosure. The solid-state image sensor according to the present disclosure may include all of the light-shielding film 701 and the light-shielding members 730 and 731, or a combination of some light-shielding units.

Furthermore, in the above-described solid-state image sensor 200a, 200b, 200c, 200d, 200e, or 200f, the impurity diffusion region 401 is provided outside a region through which a light beam of the incident light condensed on the photodiode 221 by the on-chip lens 600 passes.

As a result, the above-described solid-state image sensor 200a, 200b, 200c, 200d, 200e, or 200f can suppress a decrease in the detection accuracy of the luminance change by preventing the incident light condensed on the photodiode 221 from entering the impurity diffusion region 401.

8. Stacked Solid-State Image Sensor

[8-1. First Stacked Solid-State Image Sensor]

Figure 20:
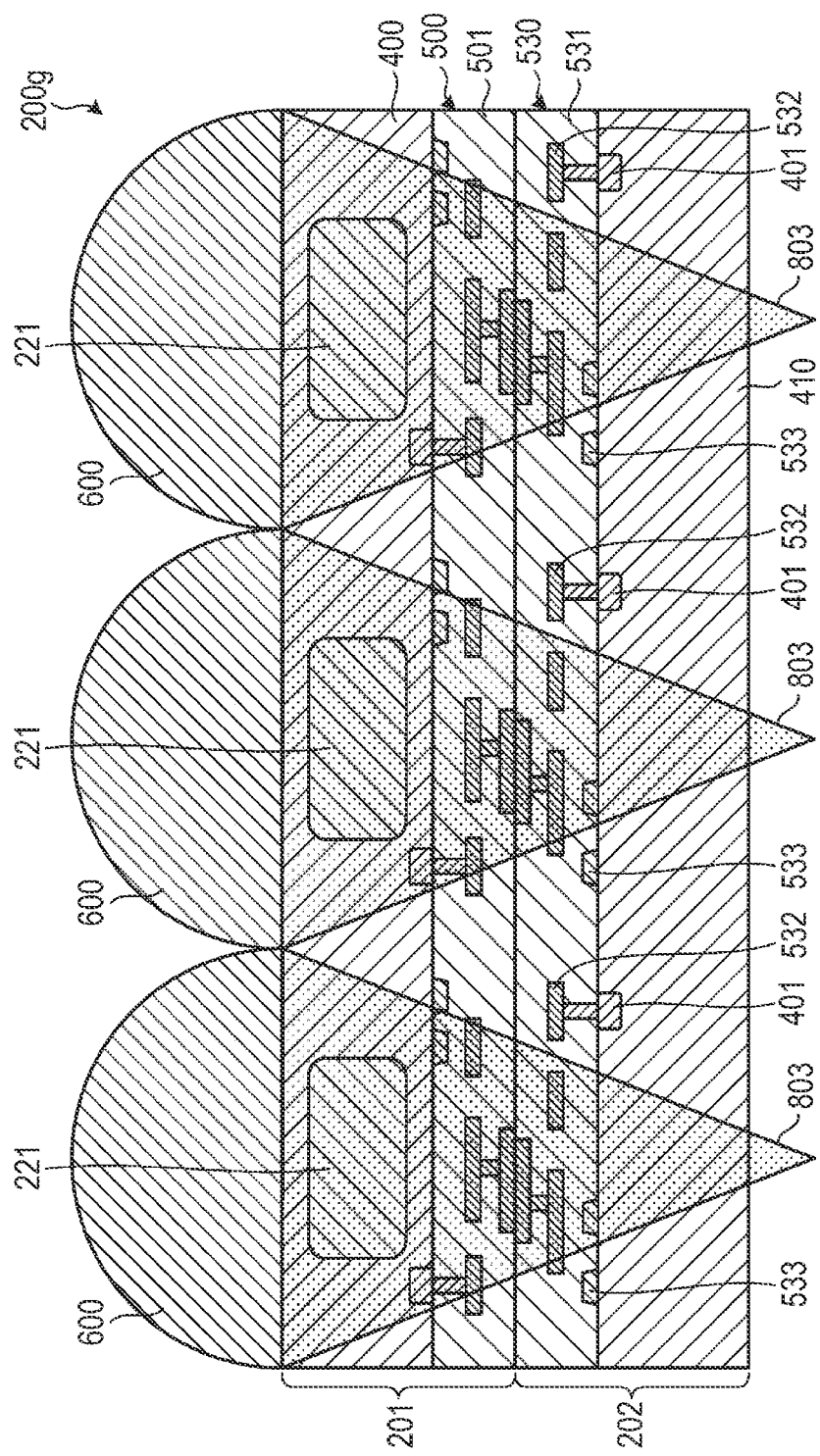
FIG. 20 is an explanatory cross-sectional view illustrating a configuration of a first stacked solid-state image sensor according to the present disclosure.

Next, a first stacked solid-state image sensor according to the present disclosure will be described with reference to FIG. 20. FIG. 20 is an explanatory cross-sectional view illustrating a configuration of the first stacked solid-state image sensor according to the present disclosure. As illustrated in FIG. 20, in the first stacked solid-state image sensor (hereinafter referred to as a solid-state image sensor 200g), the light-receiving chip 201 is stacked on and bonded to the detection chip 202, and the on-chip lens 600 is stacked on the light-receiving chip.

In the light-receiving chip 201 and the detection chip 202, the wiring layer 500 provided on an opposite surface side to the light-incident-side of the light-receiving chip 201 and a wiring layer 530 provided on the light-incident-side of the detection chip 202 are bonded and pasted. The wiring layer 500 in the light-receiving chip 201 includes the interlayer insulating film 501, the multilayer wiring 502 provided inside the interlayer insulating film 501, and the like.

In the stacked solid-state image sensor 200g, the photodiode 221 is provided in the semiconductor layer 400 in the light-receiving chip 201, and the signal processing circuit such as the address event detection circuit 300 is provided in the semiconductor layer 410 in the detection chip 202. The wiring layer 530 in the detection chip 202 includes an interlayer insulating film 531, multilayer wiring 532 provided inside the interlayer insulating film 531, a gate electrode 533 of the signal processing circuit, and the like.

Here, for example, in a case where the impurity diffusion regions A1, A2, and A3 (see FIG. 8A) included in the subtractor 330 of the address event detection circuit 300 are provided immediately below the photodiode 221 via the wiring layers 500 and 530, the impurity diffusion regions receive transmitted light and reduce the detection accuracy of the luminance change.

Therefore, in the solid-state image sensor 200g, the impurity diffusion regions 401 to be the impurity diffusion regions A1, A2, and A3 included in the subtractor 330 are provided outside a region 803 through which the light beam of the incident light condensed on the photodiode 221 by the on-chip lens 600 passes.

As a result, the solid-state image sensor 200g can suppress a decrease in the detection accuracy of the luminance change because the incident light condensed by the on-chip lens 600 does not enter the impurity diffusion region 401 even if the incident light is transmitted through the photodiode 221 and the wiring layers 500 and 530.

[8-2. Second Stacked Solid-State Image Sensor]

Figure 21:
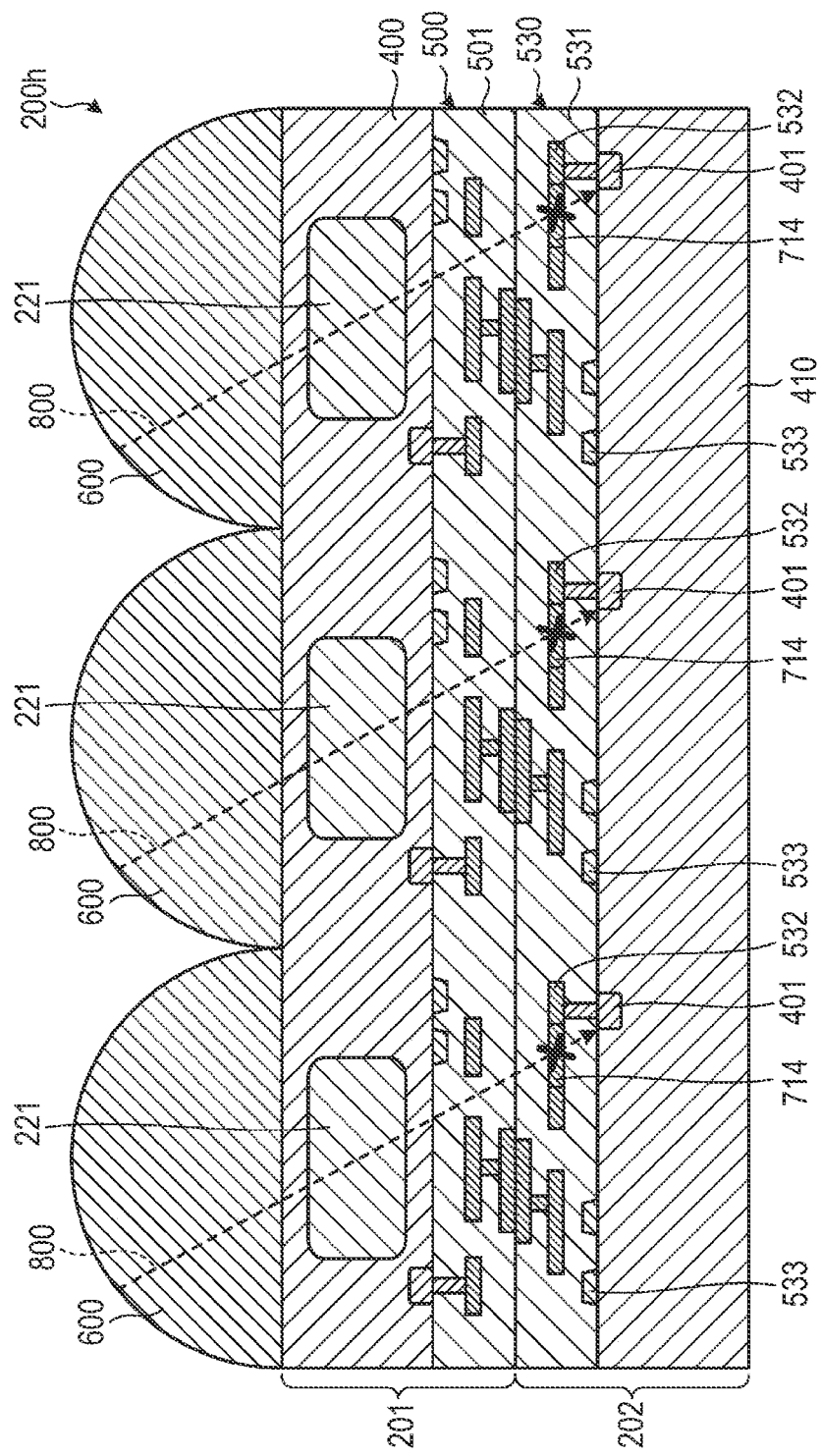
FIG. 21 is an explanatory cross-sectional view illustrating a configuration of a second stacked solid-state image sensor according to the present disclosure.

Next, a second stacked solid-state image sensor according to the present disclosure will be described with reference to FIG. 21. FIG. 21 is an explanatory cross-sectional view illustrating a configuration of the second stacked solid-state image sensor according to the present disclosure. As illustrated in FIG. 21, the first stacked solid-state image sensor (hereinafter referred to as a solid-state image sensor 200h) includes light-shielding wiring 714 in the wiring layer 530 of the detection chip 202.

The solid-state image sensor 200h can suppress a decrease in the detection accuracy of the luminance change by preventing the light 800 from entering the impurity diffusion region 401, using the light-shielding wiring 714 provided close to the side on which the incident light is incident, with respect to the impurity diffusion region 401.

[8-3. Third Stacked Solid-State Image Sensor]

Figure 22:
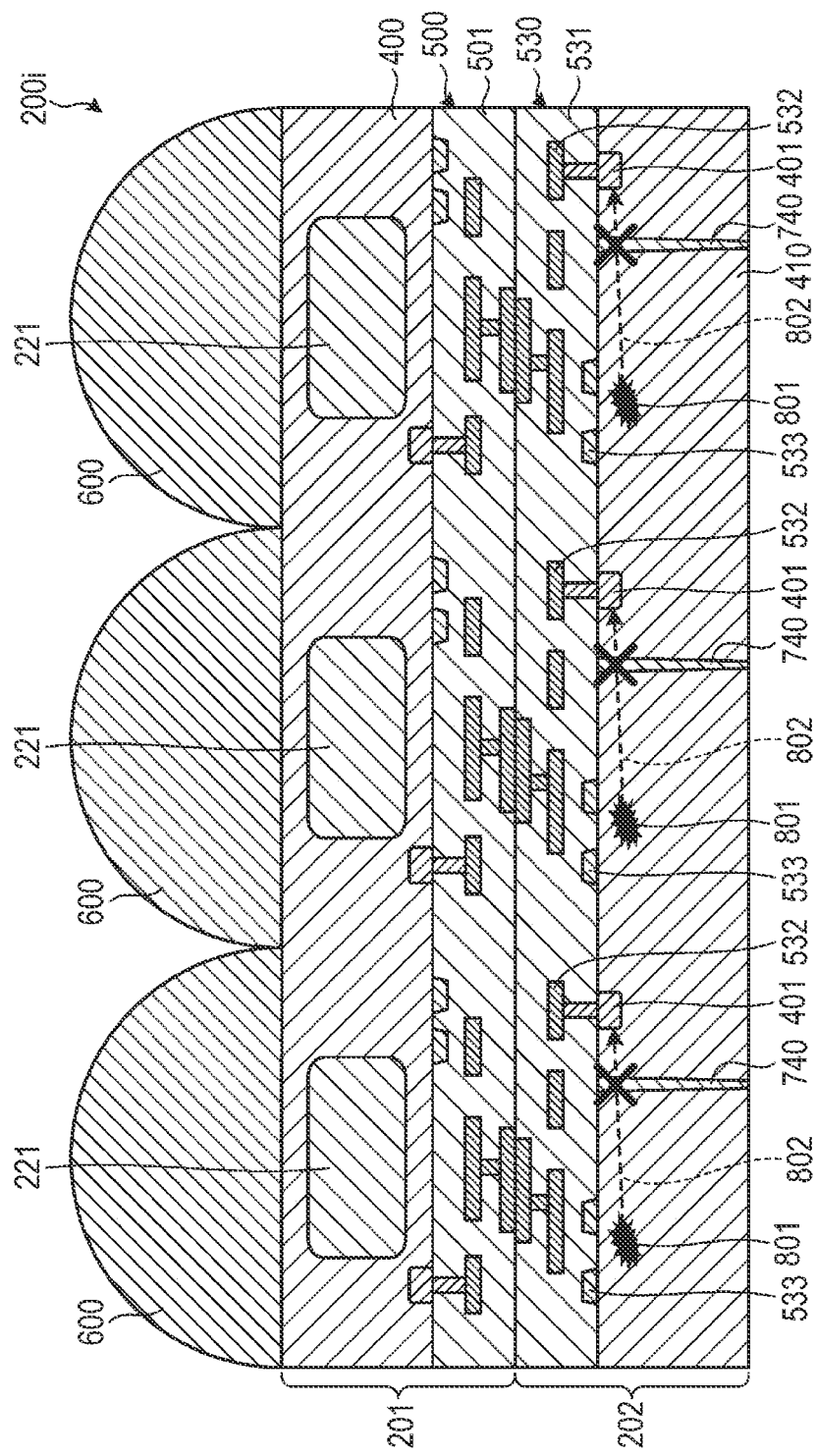
FIG. 22 is an explanatory cross-sectional view illustrating a configuration of a third stacked solid-state image sensor according to the present disclosure.

Next, a third stacked solid-state image sensor according to the present disclosure will be described with reference to FIG. 22. FIG. 22 is an explanatory cross-sectional view illustrating a configuration of a first stacked solid-state image sensor according to the present disclosure. As illustrated in FIG. 22, the second stacked solid-state image sensor (hereinafter referred to as a solid-state image sensor 200i) includes a light-shielding member 740 embedded in a trench provided between an active element that emits the HC light emission 801 and the impurity diffusion region 401.

Thereby, the solid-state image sensor 200i can prevent the light 802 by the HC light emission 801 from entering the impurity diffusion region 401, thereby suppressing a decrease in the detection accuracy of the luminance change.

Furthermore, the configurations of the solid-state image sensors 200g, 200h, and 200i illustrated in FIGS. 20 to 22 are examples of the solid-state image sensor according to the present disclosure. The impurity diffusion region 401 in the solid-state image sensor 200h or 200i may be disposed at the same position as the impurity diffusion region 401 in the solid-state image sensor 200h.

Furthermore, the solid-state image sensor 200g may include both or one of the light-shielding wiring 714 and the light-shielding member 740. The solid-state image sensor 200h may further include the light-shielding member 740. The solid-state image sensor 200i may further include the light-shielding wiring 714.

9. Another Configuration Example of Address Event Detection Circuit

Figure 23:
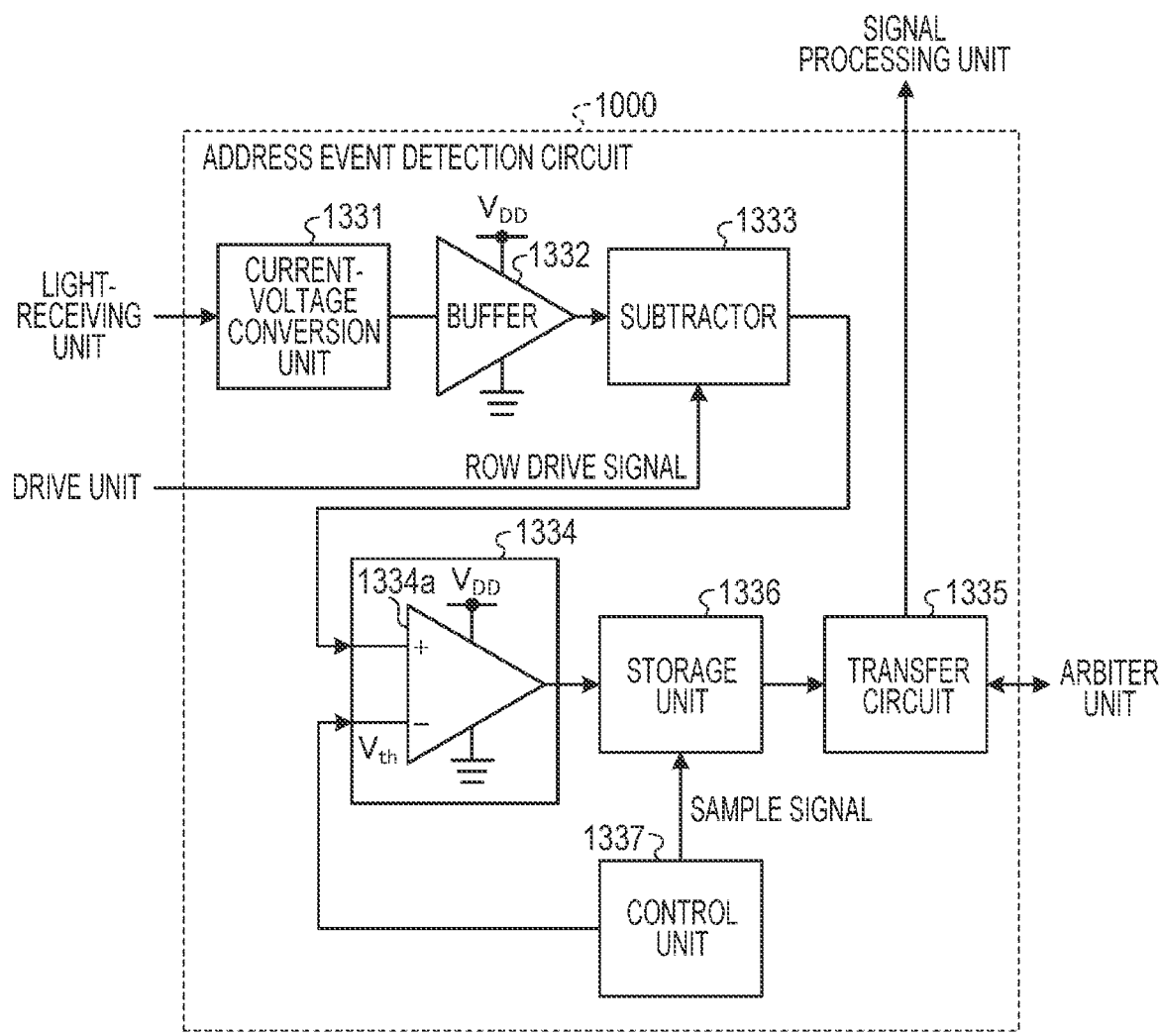
FIG. 23 is a block diagram illustrating another configuration example of the address event detection circuit according to the present disclosure.

FIG. 23 is a block diagram illustrating a second configuration example of an address event detection circuit 1000. As illustrated in FIG. 23, the address event detection circuit 1000 according to the present configuration example includes a storage unit 1336 and a control unit 1337 in addition to a current-voltage conversion unit 1331, a buffer 1332, a subtractor 1333, a quantizer 1334, and a transfer unit 1335.

The storage unit 1336 is provided between the quantizer 1334 and the transfer unit 1335, and accumulates an output of the quantizer 1334, that is, a comparison result of a comparator 1334a on the basis of a sample signal supplied from the control unit 1337. The storage unit 1336 may be a sampling circuit such as a switch, plastic, or a capacitor, or may be a digital memory circuit such as a latch or a flip-flop.

The control unit 1337 supplies a predetermined threshold voltage Vth to an inverting (−) input terminal of the comparator 1334a. The threshold voltage Vth supplied from the control unit 1337 to the comparator 1334a may have different voltage values in a time division manner. For example, the control unit 1337 supplies a threshold voltage Vth1 corresponding to an on-event indicating that a change amount of the photocurrent has exceeded an upper limit threshold and a threshold voltage Vth2 corresponding to an off-event indicating that the change amount falls below a lower limit threshold at different timings, so that the one comparator 1334a can detect a plurality of types of address events.

For example, the storage unit 1336 may accumulate the comparison result of the comparator 1334a using the threshold voltage Vth1 corresponding to the on-event in a period in which the threshold voltage Vth2 corresponding to the off-event is supplied from the control unit 1337 to the inverting (−) input terminal of the comparator 1334a. Note that the storage unit 1336 may be inside the pixel 2030 (see FIG. 24) or outside the pixel 2030. Furthermore, the storage unit 1336 is not an essential configuration element of the address event detection circuit 1000. That is, the storage unit 1336 may be omitted.

10. Configuration Example of Scan-Type Imaging Device According to Present Disclosure The above-described imaging device 100 is an asynchronous imaging device that reads events by an asynchronous readout method. However, the event readout method is not limited to the asynchronous readout method and may be the synchronous readout method. An imaging device to which the synchronous readout method is applied is a scan-type imaging device, which is the same as a normal imaging device that performs imaging at a predetermined frame rate.

Figure 24:
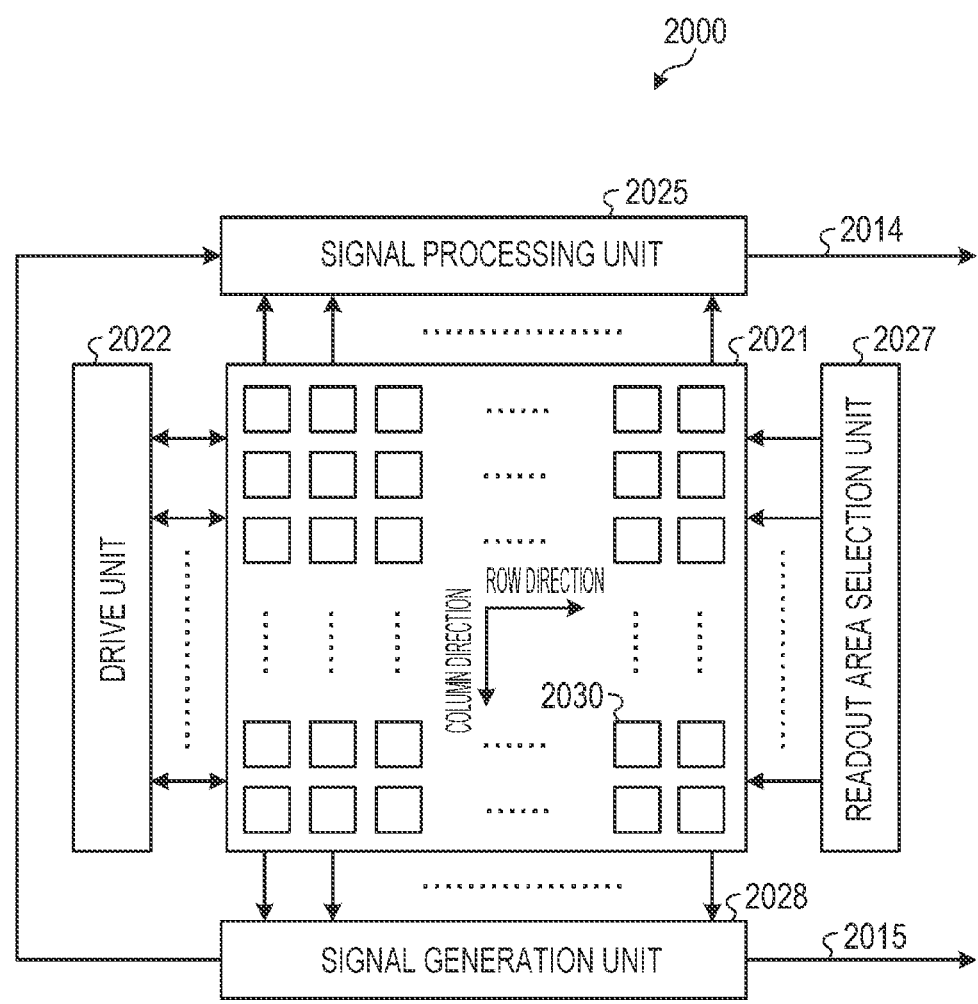
FIG. 24 is a block diagram illustrating a configuration example of a scan-type imaging device according to the present disclosure.

FIG. 24 is a block diagram illustrating a configuration example of a scan-type imaging device according to the present disclosure. As illustrated in FIG. 24, an imaging device 2000 according to the present disclosure includes a pixel array unit 2021, a drive unit 2022, a signal processing unit 2025, a readout area selection unit 2027, and a signal generation unit 2028.

The pixel array unit 2021 includes a plurality of pixels 2030. The plurality of pixels 2030 outputs output signals in response to a selection signal from the readout area selection unit 2027. Each of the plurality of pixels 2030 may have a quantizer comparator in the pixel. The plurality of pixels 2030 outputs output signals corresponding to the change amount of light intensity. The plurality of pixels 2030 may be two-dimensionally arranged in a matrix as illustrated in FIG. 24.

The drive unit 2022 drives each of the plurality of pixels 2030 and causes the signal processing unit 2025 to output the pixel signal generated in each pixel 2030. Note that the drive unit 2022 and the signal processing unit 2025 are circuit units for acquiring gradation information. Therefore, in a case of acquiring only event information, the drive unit 2022 and the signal processing unit 2025 may be omitted.

The readout area selection unit 2027 selects some of the plurality of pixels 2030 included in the pixel array unit 2021. Specifically, the readout area selection unit 2027 determines a selected area according to a request from each pixel 2030 of the pixel array unit 2021. For example, the readout area selection unit 2027 selects any one or a plurality of rows from among rows included in a structure of a two-dimensional matrix corresponding to the pixel array unit 2021. The readout area selection unit 2027 sequentially selects one or a plurality of rows according to a preset cycle. Furthermore, the readout area selection unit 2027 may determine the selected area according to a request from each pixel 2030 of the pixel array unit 2021.

The signal generation unit 2028 generates an event signal corresponding to an active pixel in which an event has been detected among the selected pixels on the basis of the output signals of the pixels selected by the readout area selection unit 2027. The event is an event in which the intensity of light changes. The active pixel is a pixel in which the change amount of the intensity of light corresponding to the output signal exceeds or falls below a preset threshold. For example, the signal generation unit 2028 compares the output signal of the pixel with a reference signal, detects the active pixel that outputs the output signal in a case where the output signal is larger or smaller than the reference signal, and generates the event signal corresponding to the active pixel.

The signal generation unit 2028 can include, for example, a column selection circuit that arbitrates signals entering the signal generation unit 2028. Furthermore, the signal generation unit 2028 may be configured to output not only the information of the active pixel in which an event has been detected but also information of inactive pixels in which an event has not been detected.

The signal generation unit 2028 outputs address information and time stamp information (for example, (X, Y, T)) of the active pixel in which the event has been detected through an output line 2015. Note that data output from the signal generation unit 2028 may be not only the address information and the time stamp information but also frame format information (for example, (0, 0, 1, 0, . . . )).

11. Distance Measuring System

A distance measuring system according to an embodiment of the present disclosure is a system for measuring a distance to an object using a structured light method technology. Furthermore, the distance measuring system according to the embodiment of the present disclosure can also be used as a system that acquires a three-dimensional (3D) image, and in this case, the system can be referred to as a three-dimensional image acquisition system. In the structured light method, distance measurement is performed by identifying coordinates of a point image and from which light source (so-called point light source) the point image is projected by pattern matching.

Figure 25:
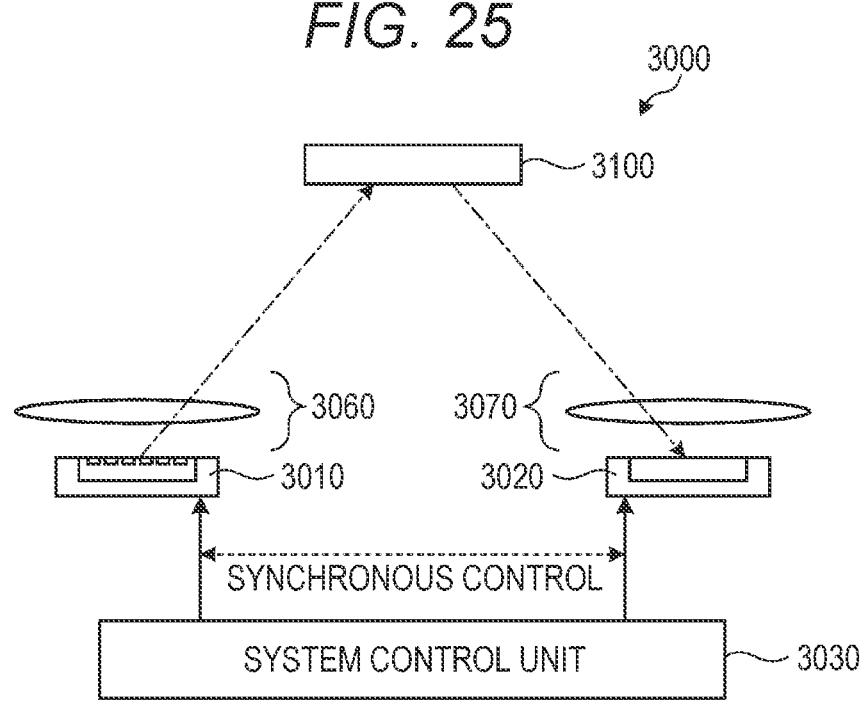
FIG. 25 is a schematic diagram illustrating a configuration example of a distance measuring system according to an embodiment of the present disclosure.
Figure 26:
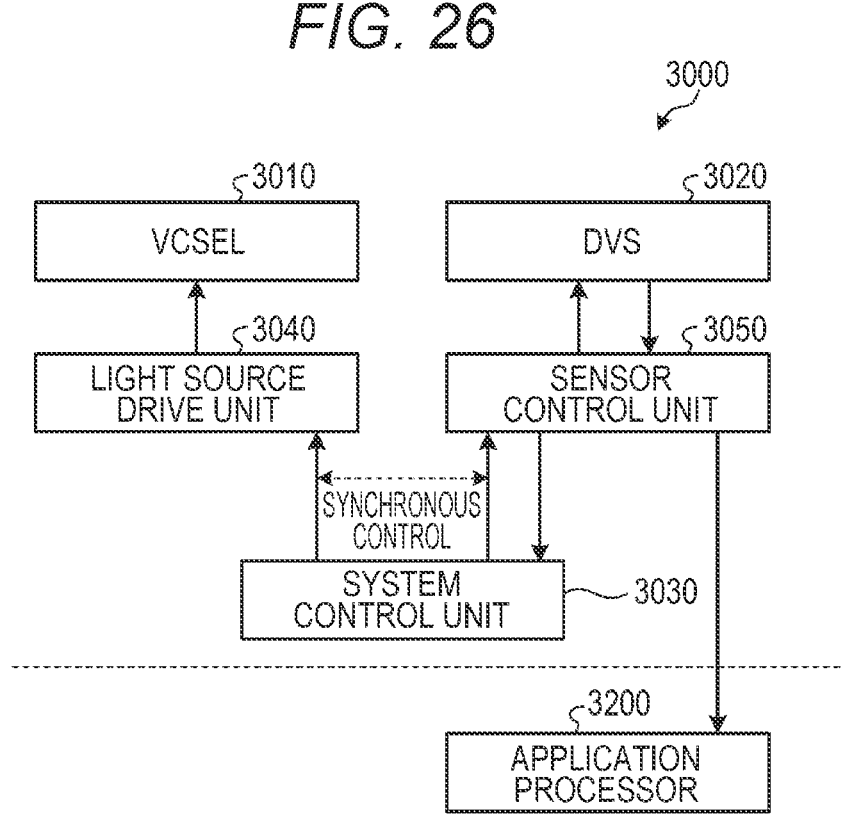
FIG. 26 is a block diagram illustrating a circuit configuration example of the distance measuring system according to an embodiment of the present disclosure.

FIG. 25 is a schematic diagram illustrating an example of a configuration of the distance measuring system according to the embodiment of the present disclosure, and FIG. 26 is a block diagram illustrating an example of a circuit configuration.

A distance measuring system 3000 according to the present embodiment uses a surface emitting semiconductor laser, for example, a vertical cavity surface emitting laser (VCSEL) 3010 as a light source unit, and uses an event detection sensor 3020 called DVS as a light-receiving unit. The vertical cavity surface emitting laser (VCSEL) 3010 projects a predetermined pattern of light onto an object. The distance measuring system 3000 according to the present embodiment includes a system control unit 3030, a light source drive unit 3040, a sensor control unit 3050, a light source-side optical system 3060, and a camera-side optical system 3070 in addition to the vertical cavity surface emitting laser 3010 and the event detection sensor 3020.

The system control unit 3030 includes, for example, a processor (CPU), and drives the vertical cavity surface emitting laser 3010 via the light source drive unit 3040 and drives the event detection sensor 3020 via the sensor control unit 3050. More specifically, the system control unit 3030 synchronously controls the vertical cavity surface emitting laser 3010 and the event detection sensor 3020.

In the distance measuring system 3000 according to the present embodiment having the above configuration, light of a predetermined pattern emitted from the vertical cavity surface emitting laser 3010 is projected onto an object (object to be measured) 3100 through the light source-side optical system 3060. The projected light is reflected by the object 3100. Then, the light reflected by the object 3100 is incident on the event detection sensor 3020 through the camera-side optical system 3070. The event detection sensor 3020 receives the light reflected by the object 3100, and detects that the luminance change of the pixel has exceeded a predetermined threshold as an event. Event information detected by the event detection sensor 3020 is supplied to an application processor 3200 outside the distance measuring system 3000. The application processor 3200 performs predetermined processing for the event information detected by the event detection sensor 3020.

12. Effect

The solid-state image sensor according to the present disclosure includes the photodiode, the conversion circuit, the luminance change detection circuit, and the light-shielding unit. The photodiode photoelectrically converts the incident light to generate the photocurrent. The conversion circuit converts the photocurrent into the voltage signal. The luminance change detection circuit detects the change in luminance of the incident light on the basis of the voltage signal. The light-shielding unit shields the incidence of light on the impurity diffusion region included in the circuit that inputs the voltage signal to the luminance change detection circuit. Thereby, the solid-state image sensor can suppress a decrease in the detection accuracy of the luminance change.

Furthermore, the light-shielding unit is a light-shielding film that covers the light-incident side of the wiring layer provided on the light-incident surface side of the semiconductor layer including the photodiode. Thereby, in the case of the front-illuminated type, the solid-state image sensor can shield the incidence of light on the impurity diffusion region from the wiring layer.

Furthermore, the light-shielding unit is a light-shielding film that covers the light-incident-side surface of the semiconductor layer including the photodiode. Thereby, in the case of the back-illuminated type, the solid-state image sensor can shield the incidence of light on the impurity diffusion region from the semiconductor layer.

Furthermore, the light-shielding film is provided at the position overlapping with the impurity diffusion region, includes the impurity diffusion region in plan view, and has the protrusion width from the outer periphery of the impurity diffusion region in side view, the protrusion width being equal to or larger than the distance to the impurity diffusion region in side view. Thereby, the solid-state image sensor can prevent the light incident from the oblique direction from entering the impurity diffusion region.

Furthermore, the light-shielding unit is light-shielding wiring in the wiring layer provided close to the side on which the incident light is incident, with respect to the impurity diffusion region. Thereby, the solid-state image sensor can prevent light from entering the impurity diffusion region only by changing the existing wiring pattern in the wiring layer without separately adding a process of forming the light-shielding unit.

Furthermore, the light-shielding wiring is provided at the position overlapping with the impurity diffusion region, includes the impurity diffusion region in plan view, and has the protrusion width from the outer periphery of the impurity diffusion region in side view, the protrusion width being equal to or larger than the distance to the impurity diffusion region in side view. Thereby, the solid-state image sensor can prevent the light incident from the oblique direction from entering the impurity diffusion region.

Furthermore, the light-shielding wiring includes a plurality of layers of wiring at least partially overlapping in plan view. Thereby, the solid-state image sensor can more reliably prevent the light from entering the impurity diffusion region than single-layer light-shielding wiring Furthermore, the light-shielding unit is a light-shielding member embedded in a trench provided between the active element that emits light by hot carriers and the impurity diffusion region. Thereby, the solid-state image sensor can prevent the light by the HC light emission from entering the impurity diffusion region.

Furthermore, the impurity diffusion region is provided outside the region through which a light beam of the incident light condensed on the photodiode by the lens passes. Thereby, the solid-state image sensor can prevent the light condensed by the lens and transmitted through the photodiode from entering the impurity diffusion region.

Furthermore, the solid-state image sensor according to the present disclosure includes the photodiode, the conversion circuit, the luminance change detection circuit, and the impurity diffusion region. The photodiode photoelectrically converts incident light to generate a photocurrent. The conversion circuit converts the photocurrent into the voltage signal. The luminance change detection circuit detects the change in luminance of the incident light on the basis of the voltage signal. The impurity diffusion region is provided outside the region through which a light beam of the incident light condensed on the photodiode by the lens passes, and is included in the circuit that inputs the voltage signal to the luminance change detection circuit. As a result, the solid-state image sensor can prevent the light condensed by the lens and transmitted through the photodiode from entering the impurity diffusion region, thereby suppressing a decrease in the detection accuracy of the luminance change.

Furthermore, the solid-state image sensor includes the light-shielding unit that shields the incidence of light on the impurity diffusion region. Thereby, the solid-state image sensor can suppress a decrease in the detection accuracy of the luminance change.

Furthermore, the light-shielding unit is a light-shielding film that covers the light-incident side of the wiring layer provided on the light-incident surface side of the semiconductor layer including the photodiode. Thereby, in the case of the front-illuminated type, the solid-state image sensor can shield the incidence of light on the impurity diffusion region from the wiring layer.

Furthermore, the light-shielding unit is a light-shielding film that covers the light-incident-side surface of the semiconductor layer including the photodiode. Thereby, in the case of the back-illuminated type, the solid-state image sensor can shield the incidence of light on the impurity diffusion region from the semiconductor layer.

Furthermore, the light-shielding film is provided at the position overlapping with the impurity diffusion region, includes the impurity diffusion region in plan view, and has the protrusion width from the outer periphery of the impurity diffusion region in side view, the protrusion width being equal to or larger than the distance to the impurity diffusion region in side view. Thereby, the solid-state image sensor can prevent the light incident from the oblique direction from entering the impurity diffusion region.

Furthermore, the light-shielding unit is light-shielding wiring in the wiring layer provided close to the side on which the incident light is incident, with respect to the impurity diffusion region. Thereby, the solid-state image sensor can prevent light from entering the impurity diffusion region only by changing the existing wiring pattern in the wiring layer without separately adding a process of forming the light-shielding unit.

Furthermore, the light-shielding wiring is provided at the position overlapping with the impurity diffusion region, includes the impurity diffusion region in plan view, and has the protrusion width from the outer periphery of the impurity diffusion region in side view, the protrusion width being equal to or larger than the distance to the impurity diffusion region in side view. Thereby, the solid-state image sensor can prevent the light incident from the oblique direction from entering the impurity diffusion region.

Furthermore, the light-shielding wiring includes a plurality of layers of wiring at least partially overlapping in plan view. Thereby, the solid-state image sensor can more reliably prevent the light from entering the impurity diffusion region than single-layer light-shielding wiring Furthermore, the light-shielding unit is a light-shielding member filled in a trench provided between the active element that emits light by hot carriers and the impurity diffusion region. Thereby, the solid-state image sensor can prevent the light by the HC light emission from entering the impurity diffusion region.

Furthermore, the impurity diffusion region is connected to a capacitive element included in the circuit that inputs the voltage signal to the luminance change detection circuit. Thereby, the solid-state image sensor has the above-described light-shielding structure, thereby suppressing variation of the voltage input to the luminance change detection circuit due to stray light.

Furthermore, the impurity diffusion region is connected to the gate of the reset transistor that discharges and resets a capacitive element included in the circuit that inputs the voltage signal to the luminance change detection circuit. Thereby, the solid-state image sensor has the above-described light-shielding structure, thereby suppressing an operation failure of the reset transistor due to stray light.

Note that the effects described in the present specification are merely examples and are not limited, and other effects may be exhibited.

Note that the present technology can also have the following configurations.

(1)
A solid-state image sensor including:
  a photodiode configured to photoelectrically convert incident light to generate a photocurrent;
  a conversion circuit configured to convert the photocurrent into a voltage signal;
  a luminance change detection circuit configured to detect a change in luminance of the incident light on a basis of the voltage signal; and
  a light-shielding unit configured to shield incidence of light on an impurity diffusion region included in a circuit that inputs the voltage signal to the luminance change detection circuit.

(2)
The solid-state image sensor according to (1), in which
  the light-shielding unit
  is a light-shielding film that covers a wiring layer stacked on a semiconductor layer including the photodiode.

(3)
The solid-state image sensor according to (1), in which
  the light-shielding unit
  is a light-shielding film that covers a light-incident-side surface of a semiconductor layer including the photodiode.

(4)
The solid-state image sensor according to (2) or (3), in which
  the light-shielding film
  is provided at a position overlapping with the impurity diffusion region, includes the impurity diffusion region in plan view, and has a protrusion width from an outer periphery of the impurity diffusion region in side view, the protrusion width being equal to or larger than a distance to the impurity diffusion region in side view.

(5)
The solid-state image sensor according to any one of (1) to (4), in which
  the light-shielding unit
  is wiring provided for a purpose of shielding light in a wiring layer provided close to a side where the incident light is incident, with respect to the impurity diffusion region.

(6)
The solid-state image sensor according to (5), in which
  the wiring provided for the purpose of shielding light
  is provided at a position overlapping with the impurity diffusion region, includes the impurity diffusion region in plan view, and has a protrusion width from an outer periphery of the impurity diffusion region in side view, the protrusion width being equal to or larger than a distance to the impurity diffusion region in side view.

(7)
The solid-state image sensor according to (5) or (6), in which
  the wiring provided for the purpose of shielding light
  includes a plurality of layers of wiring at least partially overlapping in plan view.

(8)
The solid-state image sensor according to any one of (1) to (7), in which
  the light-shielding unit
  includes a light-shielding member embedded in a trench provided between an active element that emits light by hot carriers and the impurity diffusion region.

(9)
The solid-state image sensor according to any one of (1) to (8), in which
  the impurity diffusion region
  is provided outside a region through which a light beam of the incident light condensed on the photodiode by a lens passes.

(10)
A solid-state image sensor including:
  a photodiode configured to photoelectrically convert incident light to generate a photocurrent;
  a conversion circuit configured to convert the photocurrent into a voltage signal;
  a luminance change detection circuit configured to detect a change in luminance of the incident light on a basis of the voltage signal; and
  an impurity diffusion region provided outside a region through which a light beam of the incident light condensed on the photodiode by a lens passes, and included in a circuit that inputs the voltage signal to the luminance change detection circuit.

(11)
The solid-state image sensor according to (10), further including:
  a light-shielding unit configured to shield incidence of light on the impurity diffusion region.

(12)
The solid-state image sensor according to (11), in which
  the light-shielding unit
  is a light-shielding film that covers a wiring layer stacked on a semiconductor layer including the photodiode.

(13)

The solid-state image sensor according to (11), in which
the light-shielding unit
is a light-shielding film that covers a light-incident-side surface of a semiconductor layer including the photodiode.

(14)

The solid-state image sensor according to (12) or (13), in which
the light-shielding film
is provided at a position overlapping with the impurity diffusion region, includes the impurity diffusion region in plan view, and has a protrusion width from an outer periphery of the impurity diffusion region in side view, the protrusion width being equal to or larger than a distance to the impurity diffusion region in side view.

(15)

The solid-state image sensor according to any one of (11) to (14), in which
the light-shielding unit
is wiring provided for a purpose of shielding light in a wiring layer provided close to a side where the incident light is incident, with respect to the impurity diffusion region.

(16)

The solid-state image sensor according to (15), in which
the wiring provided for the purpose of shielding light
is provided at a position overlapping with the impurity diffusion region, includes the impurity diffusion region in plan view, and has a protrusion width from an outer periphery of the impurity diffusion region in side view, the protrusion width being equal to or larger than a distance to the impurity diffusion region in side view.

(17)

The solid-state image sensor according to (15) or (16), in which
the wiring provided for the purpose of shielding light
includes a plurality of layers of wiring at least partially overlapping in plan view.

(18)

The solid-state image sensor according to any one of (11) to (17), in which
the light-shielding unit
includes a light-shielding member embedded in a trench provided between an active element that emits light by hot carriers and the impurity diffusion region.

(19)

The solid-state image sensor according to any one of (1) to (18), in which
the impurity diffusion region
is connected to a capacitive element included in a circuit that inputs the voltage signal to the luminance change detection circuit.

(20)

The solid-state image sensor according to any one of (1) to (19), in which
the impurity diffusion region
is connected to a gate of a reset transistor that discharges and resets a capacitive element included in a circuit that inputs the voltage signal to the luminance change detection circuit.

REFERENCE SIGNS LIST

100 Imaging device
110 Imaging lens
120 Recording unit
130 Control unit
200 Solid-state image sensor
201 Light-receiving chip
202 Detection chip
211, 212, 213, 231, 232, 233 Via arrangement portion
220 Light-receiving unit
221 Photodiode
240 Signal processing circuit
251 Row drive circuit
252 Column drive circuit
260 Address event detection unit
300 Address event detection circuit
310 Current-voltage conversion circuit
311 Conversion transistor
312 Current source transistor
313 Voltage supply transistor
320 Buffer
330 Subtractor
331, 333 Capacitor
332 Inverter
334 Switch
340, 340a Quantizer
341 Comparator
350 Transfer circuit
400, 410 Semiconductor layer
500, 530 Wiring layer
501, 531 Interlayer insulating film
502, 532 Wiring
503, 533 Gate electrode
600 On-chip lens
700, 701 Light-shielding film
710, 711, 712, 714 Light-shielding wiring
720, 730, 731, 740 Light-shielding member

What is claimed is:

1. A solid-state image sensor, comprising:
a photodiode configured to photoelectrically convert incident light to generate a photocurrent;
a conversion circuit configured to convert the photocurrent into a voltage signal;
a luminance change detection circuit configured to detect a change in luminance of the incident light on a basis of the voltage signal; and
a light-shielding unit configured to shield incidence of light on an impurity diffusion region included in a circuit that inputs the voltage signal to the luminance change detection circuit.

2. The solid-state image sensor according to claim 1, wherein
the light-shielding unit
is a light-shielding film that covers a wiring layer stacked on a semiconductor layer including the photodiode.

3. The solid-state image sensor according to claim 1, wherein
the light-shielding unit
is a light-shielding film that covers a light-incident-side surface of a semiconductor layer including the photodiode.

4. The solid-state image sensor according to claim 2, wherein
the light-shielding film
is provided at a position overlapping with the impurity diffusion region, includes the impurity diffusion region in plan view, and has a protrusion width from an outer periphery of the impurity diffusion region in side view, the protrusion width being equal to or larger than a distance to the impurity diffusion region in side view.

5. The solid-state image sensor according to claim 1, wherein
the light-shielding unit
is wiring provided for a purpose of shielding light in a wiring layer provided close to a side where the incident light is incident, with respect to the impurity diffusion region.

6. The solid-state image sensor according to claim 5, wherein
the wiring provided for the purpose of shielding light
is provided at a position overlapping with the impurity diffusion region, includes the impurity diffusion region in plan view, and has a protrusion width from an outer periphery of the impurity diffusion region in side view, the protrusion width being equal to or larger than a distance to the impurity diffusion region in side view.

7. The solid-state image sensor according to claim 5, wherein
the wiring provided for the purpose of shielding light
includes a plurality of layers of wiring at least partially overlapping in plan view.

8. The solid-state image sensor according to claim 1, wherein
the light-shielding unit
includes a light-shielding member embedded in a trench provided between an active element that emits light by hot carriers and the impurity diffusion region.

9. The solid-state image sensor according to claim 1, wherein
the impurity diffusion region
is provided outside a region through which a light beam of the incident light condensed on the photodiode by a lens passes and is connected to a capacitive element included in a circuit that inputs the voltage signal to the luminance change detection circuit.

10. A solid-state image sensor, comprising:
a photodiode configured to photoelectrically convert incident light to generate a photocurrent;
a conversion circuit configured to convert the photocurrent into a voltage signal;
a luminance change detection circuit configured to detect a change in luminance of the incident light on a basis of the voltage signal;
an impurity diffusion region provided outside a region through which a light beam of the incident light condensed on the photodiode by a lens passes, and included in a circuit that inputs the voltage signal to the luminance change detection circuit; and
a light-shielding unit configured to shield incidence of light on the impurity diffusion region.

11. The solid-state image sensor according to claim 10, wherein
the light-shielding unit
is a light-shielding film that covers a wiring layer stacked on a semiconductor layer including the photodiode.

12. The solid-state image sensor according to claim 10, wherein
the light-shielding unit
is a light-shielding film that covers a light-incident-side surface of a semiconductor layer including the photodiode.

13. The solid-state image sensor according to claim 11, wherein
the light-shielding film
is provided at a position overlapping with the impurity diffusion region, includes the impurity diffusion region in plan view, and has a protrusion width from an outer periphery of the impurity diffusion region in side view, the protrusion width being equal to or larger than a distance to the impurity diffusion region in side view.

14. The solid-state image sensor according to claim 10, wherein
the light-shielding unit
is wiring provided for a purpose of shielding light in a wiring layer provided close to a side where the incident light is incident, with respect to the impurity diffusion region.

15. The solid-state image sensor according to claim 14, wherein
the wiring provided for the purpose of shielding light
is provided at a position overlapping with the impurity diffusion region, includes the impurity diffusion region in plan view, and has a protrusion width from an outer periphery of the impurity diffusion region in side view, the protrusion width being equal to or larger than a distance to the impurity diffusion region in side view.

16. The solid-state image sensor according to claim 14, wherein
the wiring provided for the purpose of shielding light
includes a plurality of layers of wiring at least partially overlapping in plan view.

17. The solid-state image sensor according to claim 10, wherein
the light-shielding unit
includes a light-shielding member filled in a trench provided between an active element that emits light by hot carriers and the impurity diffusion region.

18. The solid-state image sensor according to claim 1, wherein
the impurity diffusion region
is connected to a capacitive element included in a circuit that inputs the voltage signal to the luminance change detection circuit.

19. The solid-state image sensor according to claim 1, wherein
the impurity diffusion region
is connected to a gate of a reset transistor that discharges and resets a capacitive element included in a circuit that inputs the voltage signal to the luminance change detection circuit.

* * * * *